United States Patent [19]
Ricciardi et al.

[11] 4,210,963
[45] Jul. 1, 1980

[54] WEIGH FEEDER SYSTEM
[76] Inventors: Ronald J. Ricciardi, 108 Malcolm Ave., Garfield, N.J. 07026; Angelo Ferrara, 7 Bryn Mawr Way, Fairfield; Joseph L. Hartmann, 85 Hillside Ave., West Caldwell, both of N.J. 07006
[21] Appl. No.: 913,203
[22] Filed: Jun. 6, 1978

Related U.S. Application Data

[63] Continuation of Ser. No. 803,251, Jun. 3, 1977, abandoned, which is a continuation of Ser. No. 678,391, Apr. 19, 1976, Pat. No. 4,054,784, which is a continuation-in-part of Ser. No. 587,869, Jun. 18, 1975, abandoned.

[51] Int. Cl.$^2$ .................... G01G 11/08; G06F 15/46
[52] U.S. Cl. .................... 364/567; 364/571; 177/25
[58] Field of Search .............. 364/567, 571, 510, 565; 177/1, 25, 59, 60, 64; 222/58, 55

[56] References Cited

U.S. PATENT DOCUMENTS

| | | | |
|---|---|---|---|
| Re. 27,115 | 4/1971 | Goff et al. .................... 222/58 |
| 266,157 | 10/1882 | Hurt et al. .................... 222/58 |
| 2,544,155 | 3/1951 | Harkenrider .................... 222/58 |
| 2,984,386 | 5/1961 | White .................... 222/58 |
| 3,116,801 | 1/1964 | Bauder et al. .................... 177/1 |
| 3,329,311 | 7/1967 | Goff et al. .................... 222/1 |
| 3,329,313 | 7/1967 | Mayer .................... 222/58 |
| 3,474,874 | 10/1969 | Pettis, Jr. .................... 177/50 |
| 3,477,529 | 11/1969 | Burn et al. .................... 177/50 |
| 3,481,509 | 12/1969 | Marhauer .................... 222/1 |
| 3,494,507 | 2/1970 | Ricciardi .................... 222/36 |
| 3,498,395 | 3/1970 | Henry .................... 177/1 |
| 3,511,412 | 5/1970 | Wolfenden et al. .................... 222/58 |
| 3,532,253 | 10/1970 | Godwin .................... 222/58 |
| 3,708,026 | 1/1973 | Senour .................... 177/60 |
| 3,724,720 | 4/1973 | Bullivant .................... 222/55 |
| 3,805,903 | 4/1974 | Muskat et al. .................... 177/50 |
| 3,822,809 | 7/1974 | Foucault et al. .................... 222/71 |
| 3,837,415 | 9/1974 | Connors et al. .................... 177/123 |
| 3,855,458 | 12/1974 | Motter et al. .................... 222/55 X |
| 3,856,097 | 12/1974 | Bartio et al. .................... 177/1 |
| 3,889,848 | 6/1975 | Ricciardi et al. .................... 222/58 |
| 3,945,448 | 3/1976 | Sellers .................... 177/25 |
| 3,967,758 | 7/1976 | Ferrara .................... 222/58 |
| 3,985,266 | 10/1976 | Wright, Jr. .................... 222/22 |
| 4,023,021 | 5/1977 | Kuschel .................... 177/60 |
| 4,037,598 | 7/1977 | Georgi .................... 222/59 X |
| 4,054,784 | 10/1977 | Ricciardi et al. .................... 364/479 |

FOREIGN PATENT DOCUMENTS

| | | |
|---|---|---|
| 1186175 | 2/1955 | Fed. Rep. of Germany .......... 364/567 |
| 1214054 | 10/1958 | Fed. Rep. of Germany .......... 364/567 |
| 1224054 | 11/1960 | Fed. Rep. of Germany .......... 364/567 |
| 1549191 | 2/1967 | Fed. Rep. of Germany .......... 364/567 |
| 1549291 | 11/1967 | Fed. Rep. of Germany .......... 364/567 |
| 490669 | 3/1970 | Fed. Rep. of Germany .......... 364/567 |
| 2060490 | 12/1970 | Fed. Rep. of Germany .......... 364/567 |

OTHER PUBLICATIONS

Elektrische Ausrüstungen für Zementwerke, H. G. Wacher, Bauverlag GmbH, Wiesbaden, Berlin, pp. 153-154, 5/26/77.
Hütte Taschenbuch für Betriebsingenieure, Hütte, Verlag Van Wilhelm Ernst & Sohn, Berlin, Munich, pp. 245-248, 5/26/77.

*Primary Examiner*—Edward J. Wise
*Attorney, Agent, or Firm*—Edwin T. Grimes

[57] ABSTRACT

Disclosed herein is an automatically controlled weigh feeding apparatus including a container prefilled with a substance, a device for discharging the substance from the container at a controllable weight, apparatus for weighing the container and its contents and for producing an electrical signal proportional to that weight, a first amplifier for amplifying the electrical signal, a first analog-digital converter coupled to said first amplifier and a digital computer coupled to said first analog-digital converter for computing the weight of substance remaining in the container. A second amplifier is coupled to said first amplifier and a ramp off-set circuit which is controlled by the digital computer inputs a second signal to the second amplifier means having a controlled stepping output applied as a second input signal to the second amplifier to maintain the output of the second amplifier within a given selected range of amplitude during one time cycle of operation. A second analog-digital converter interposed between the second amplifier and the digital computer. The digital computer is adapted to compute a corrective signal based on the signal received for controlling the discharge of the substance from the container.

13 Claims, 16 Drawing Figures

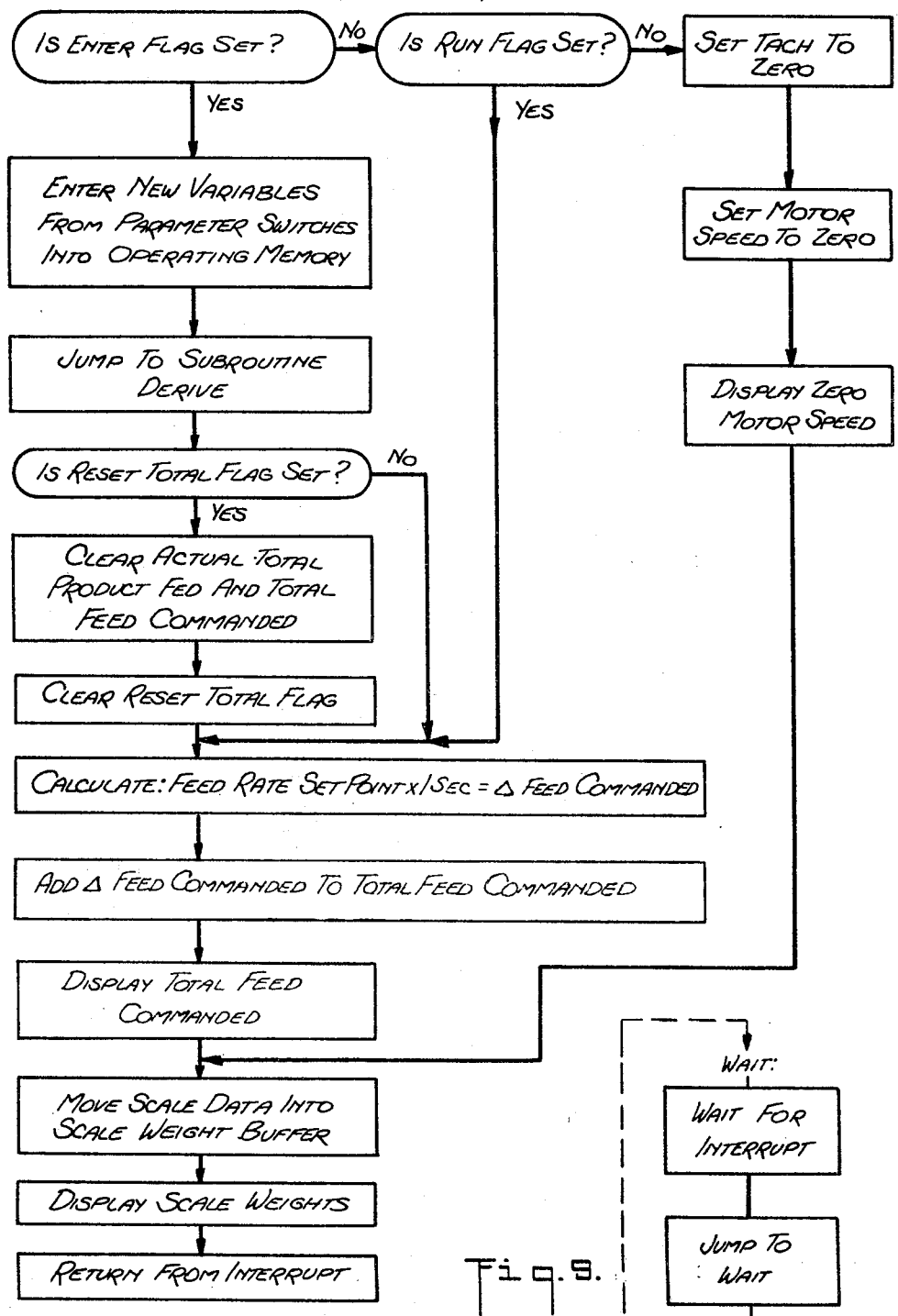

Fig. 11.
Subroutine Derive:

- Calculate Normal Conversion Time = Scale WT × 2.5 (In Sec.) / Feed Rate Set Point
- Normal Conversion Time / 256
- Round Off Approx Time To Nearest Millisec
- Put Round Time In Ready Q
- Return From Subroutine

Fig. 13.
Calculate:

- Calculate Straight Line (Least Square) From 256 Data Points
- Calculate Sigma
- Calculate 256 Nominal Data Points
- Return From Subroutine

Fig. 14.
Learn Mode Flow Chart

- Determine Motor Speed For Which You Wish To Make Correction By Running Product At Desired Gravimetric Rate
- Put Bucket On Scale But Under Output Tube So No Loss In Weight Is Achieved
- Put Switch To Learn (Clock Interrupt Routine)
- Adjust Volumetric Learn Pot For Desired Motor Speed
- Allow To Run For 1 Complete Revolution Of Intromitter Shaft
- Store Feedrate (vs) Shaft Encoder Data In Memory
- Switch Learn-Off-On Switch To Off Corrections To Feedrate Are Now In Memory & Will Be Used If Learn Switch Is "Off"

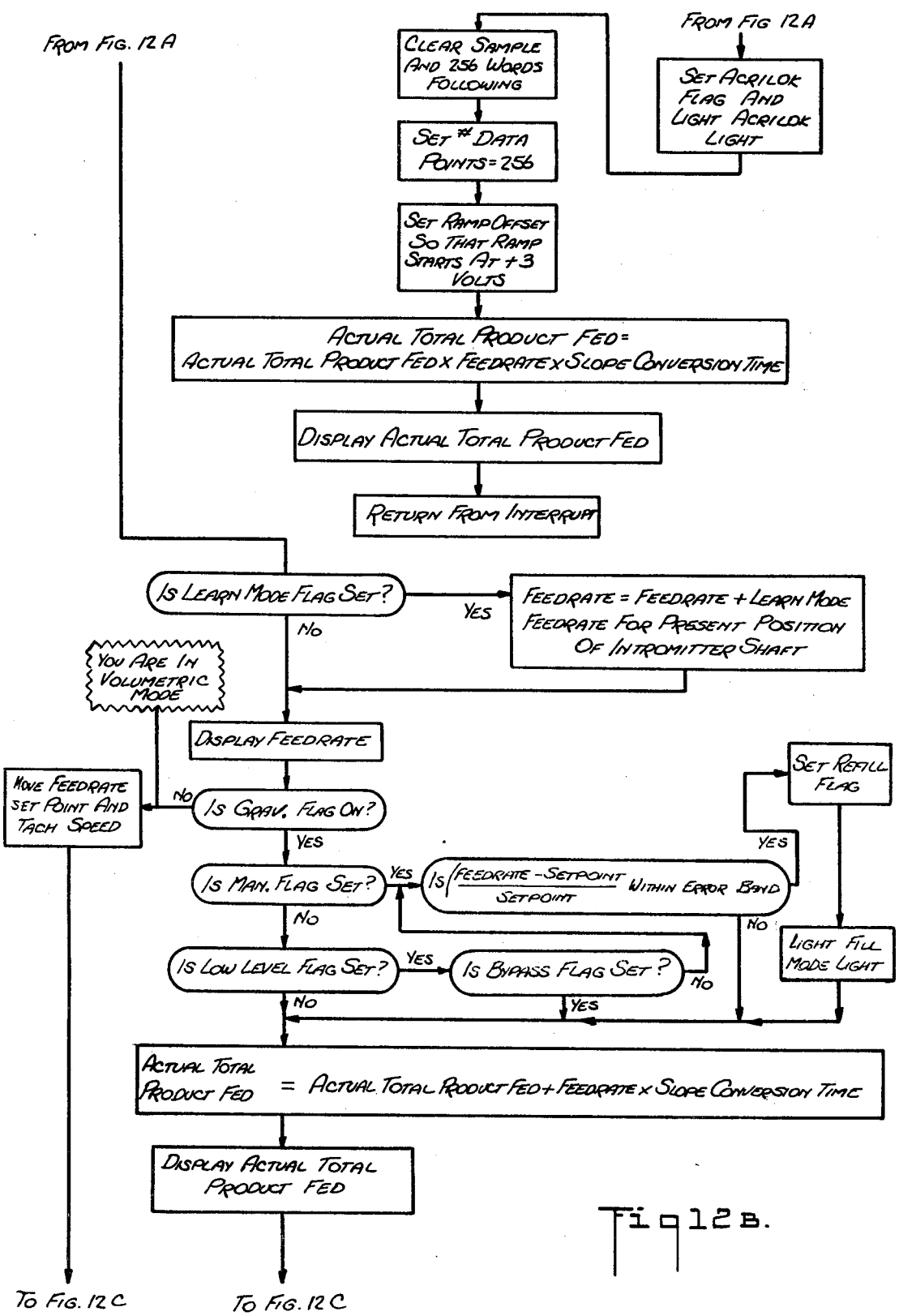

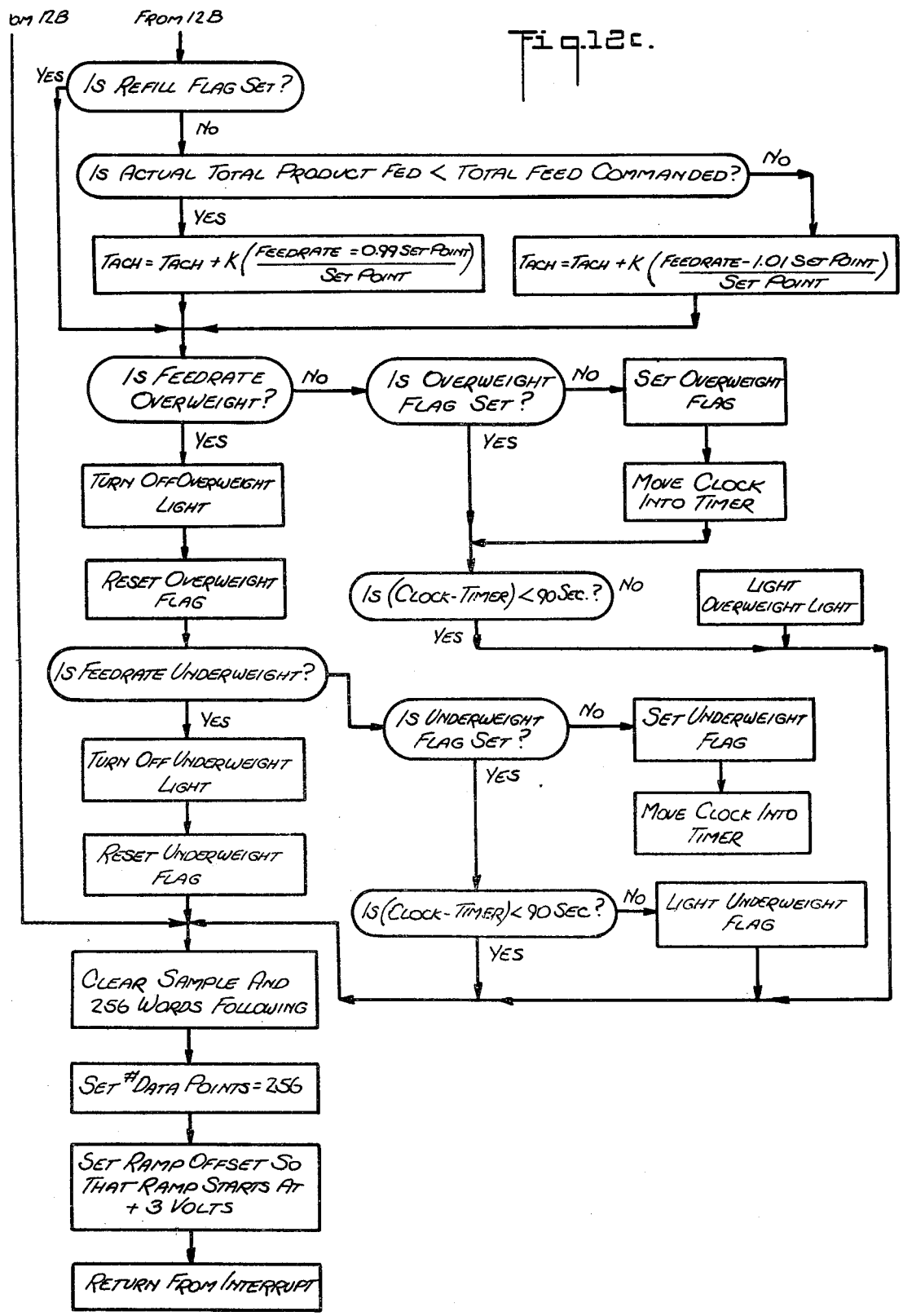

WEIGH FEEDER SYSTEM

This is a continuation of application Ser. No. 803,251, filed June 3, 1977, which is a continuation of application Ser. No. 678,391, filed Apr. 19, 1976 now U.S. Pat. No. 4,054,784 which, in turn, is a continuation-in-part of application Ser. No. 587,869 filed June 18, 1975, now abandoned.

This invention relates to weigh feeding systems and it is particularly applicable to apparatus for feeding fluid-like material. Systems constructed according to the present invention are particularly adapted, among other possible uses, for accurately weigh feeding a wide variety of substances including dry materials regardless of whether the material is free-flowing, sluggish, or pressure sensitive; and ranging from amorphous powders to flakes, pellets, chunks and even fibers, as well as liquids.

Various control weigh feeding systems have been known in the past, as for example, the system disclosed in U.S. Patent Application Ser. No. 345,587, filed Mar. 28, 1973, which has issued as U.S. Pat. No. 3,889,848. In accordance with this application, there is provided a weigh feeding apparatus wherein the discharge rate of a fluid substance from a container is maintained at a predetermined constant value. The container and its contents are weighed, and an electrical signal is produced which signal has an amplitude proportional to the weight of the container and its contents. This electrical signal, which varies as the contents of the container are discharged, is differentiated and applied to a comparator circuit together with a reference signal, wherefore the output of the comparator circuit may be used to control said discharge rate of the substance as it is fed from the container. The comparator output is applied to a signal generator for producing a motor drive signal for a DC motor having its output shaft connected to drive a device for discharging the substance from the container. The signal generator may comprise a pulsing circuit for controlling a pair of SCR's which are disposed in a rectifying bridge circuit connected between an AC voltage source and the input of the DC motor. Accordingly, the speed of the motor is controlled by the pulsing circuit, which, in turn, is controlled by the algebraic sum of the output signal of a tachometer generator which is coupled directly to the motor shaft, and output signal from the comparator. It can be stated that the above-described apparatus provides an accurate weigh feeding system, whereby the feeding rate may be maintained at a constant value, and wherein the predetermined feeding rate may be adjusted by adjusting the value of the reference signal source.

Additionally, the output of the weighing device may be applied to a pair of differential amplifier circuits, along with a pair of reference voltage inputs, for determining when the contents of the container varies above and below desired maximum and minimum fill levels for the container. That is, circuitry is provided for automatically refilling the container when the weight of the substance therein reaches the desired minimum weight, and for terminating the filling process for the container when the fluid substance therein reaches the desired maximum weight. Such circuitry includes means for maintaining the discharge rate of the container at a constant rate equal to the instantaneous rate thereof immediately preceding energization of the filling device for the container. Particularly, the pair of differential amplifier circuits are coupled to a pair of relay driver circuits for controlling a relay circuit to energize the filling device when the substance in the container reaches the minimum weight, and for maintaining that filling device in an energized state until the container is refilled to its maximum desired level. The relay circuit is also coupled to the comparator circuit, for controlling the latter to produce a constant output during the refilling process for the container, thereby maintaining the discharge rate of the container at the value of the particular discharge rate thereof immediately preceding energization of the filling device.

As pointed out in said U.S. Pat. No. 3,889,848, in certain installations there exists a possibility of physical forces impinging upon the weigh feeder from an external source, such as wind or air currents, physical contact with the weigh feeder by operating personnel, or the like, for example. These forces cause the weigh feeder to move at a rate that is other than that resulting from the linear discharge of the contents of the container. Because such additional movement, i.e. acceleration, is an error and has no direct relationship to the actual discharge of material from the container, the control system could continue to perform its corrective function utilizing the erroneous output signal for comparison with the fixed set point reference signal derivative. The aforementioned patent discloses one means for preventing such excessive and abnormal movements of the weigh feeder scale from grossly affecting or disturbing the normal operation of the system to thereby prevent large excursions of the output feed rate.

The present invention is directed to new improved means for accomplishing the foregoing objectives, as well as additional objectives, as will become apparent as the description proceeds.

Another feature of the present invention resides in the provision of a new and improved weigh feeder system, which is capable of controlling more operating parameters, which operates faster, which provides a faster responsive action, and which is more accurate as compared to the prior art systems. In addition, the feeder system of the present invention has a memory and is capable of taking into account past errors in the material flow rate and taking corrective action with respect thereto.

Also, the system is capable of disregarding extraneous material flow rate readings, which may be caused by such factors as noise, vibrations, or the like, for example.

In one form of the invention, we provide a new and improved weigh feeding apparatus characterized by a container for a prefilled substance having means for discharging the substance therefrom at a controllable rate. A scale system is provided for weighing the container prefilled with the substance and an electrical circuit serves to produce a first electrical signal proportional in amplitude to the weight, and a high gain amplifier amplifies the electrical signal. An analog-digital converter (ADC) is coupled to the amplifier and a digital computer is adapted to receive pulse signals from the ADC for computing and outputting a signal corresponding to the signal received. Digital-analog converter ramp offset means which is controlled by the computer outputs a controlled stepping signal, that is applied as a second input to the amplifier means to algebraically combine therewith. Each step corresponds to one time cycle of operation, thereby maintaining the output of the amplifier in a given preselected range of amplitude during one time cycle of operation.

The digital computer as another operation thereof computes a corrective signal based on the signal received, and means coupled between the computer and the means for discharging the substance from the container, serve to control the rate of discharge responsive to the corrective signal.

According to one aspect of the invention, the weigh feeder apparatus further comprises means for inputting into the digital computer a preselected feed rate, and the computer is adapted to store in memory a series of signals received from the ADC for each of the time cycles of operation and compute a corrective signal by comparing the signals received with the preselected feed rate. According to another aspect of the invention, the weight feeding apparatus further comprises an under-weight limit input means to the computer and an over-weight limit input means thereto. The computer, as one operation thereof, causes an underweight or an overweight light to energize when an underweight or an overweight condition exists for longer than some preset period of time. Further, according to another aspect of the invention, the digital computer computes the corrective signal, while disregarding a preselected number of the signals received from the ADC, which exceed a set limit during one time cycle of operation, when computing the corrective signal.

The invention provides, according to another form thereof, a new and improved weigh feeding apparatus which is characterized by a container for a prefilled substance and means for discharging the substance from the container at a controllable rate of weight loss. A scale is provided for weighing the container prefilled with the substance and an electrical circuit is coupled to the weighing means for producing a first electrical signal proportional in amplitude to the weight determined by the weighing means. A first amplifier amplifies the electrical signal and a first analog-digital converter (ADC) is coupled to the first amplifier and outputs binary words to a digital computer thereto. The digital computer, as one operation thereof, computes a first output signal corresponding to the weight of the substance in the container. A second amplifier amplifies a signal received from the first amplifier and a second ADC is coupled to the second amplifier and outputs a binary word signal to the digital computer. Digital-analog converter ramp offset means are provided which receive a signal from the digital computer and outputs a controlled stepping output which is algebraically combined with the input to the second amplifier, each step corresponding to one time cycle of operation, thereby to maintain the output of the second amplifier in a given preselected range of amplitude during one time cycle of operation. An input switch is provided to apply a preselected feed rate value to the computer. The computer, as another operation thereof, stores in memory a series of said signals received from the second ADC for each of the time cycles of operation and computes a corrective signal by comparing the signals received with the preselected feed rate value. Coupling means interconnect the computer and the means for discharging the substance from the container, whereby the corrective signal serves to control the rate of discharge of the substance from the container. A shaft encoder is coupled to the computer to allow vibration signals generated from the rotating machinery mounted on the scale to be corrected for in the computation of the feed rates.

In still another form of the invention there is provided a weigh feeding apparatus which includes a container for a prefilled substance, means for discharging the substance from the container at a controllable rate, means for weighing the container prefilled with the substance, and means coupled to the weighing means for producing electrical signals proportional to the weight determined by the weighing means. In addition, the apparatus further includes an analog-digital converter for receiving the electrical signals, digital computer means coupled to the analog-digital converter for computing a corrective signal based on the signals received, and means coupled between the computer means and the means for discharging the substance from the container for controlling the rate of discharge responsive to the corrective signal. Further, this weigh feeding apparatus comprises, means for inputting into the computer means a preselected feed rate, said computer means being adapted to store a series of the signals received from the analog-digital converter for a time cycle of operation and computing said corrective signal by comparing the signals received with the preselected feed rate, and said computer being further adapted to maintain the corrected signal constant during the time when a preselected number of the signals received from the analog-digital converter exceeds preselected upper or lower limits, during one time cycle of operation.

There has thus been outlined rather broadly the more important features of the invention in order that the detailed description thereof that follows may be better understood, and in order that the present contribution to the art may be better appreciated. There are, of course, additional features of the invention that will be described more fully hereinafter. Those skilled in the art will appreciate that the conception on which this disclosure is based may readily be utilized as the basis of the designing of other structures for carrying out the various purposes of the invention. It is important, therefore, that this disclosure be regarded as including such equivalent constructions and methods as do not depart from the spirit and scope of the invention.

One embodiment of the invention has been chosen for purposes of illustration and description, and is shown in the accompanying drawings forming a part of the specification, wherein:

FIG. 9 is a flow chart of the wait subroutine;

FIG. 10 is a flow chart of the one second interrupt display subroutine;

FIG. 11 is a flow chart of the derive subroutine;

FIGS. 12A, 12B and 12C is a flow chart of the main routine of the computer;

FIG. 13 is a flow chart of the calculate subroutine; and

FIG. 14 is a flow chart of the learn mode subroutine.

Figure 1:
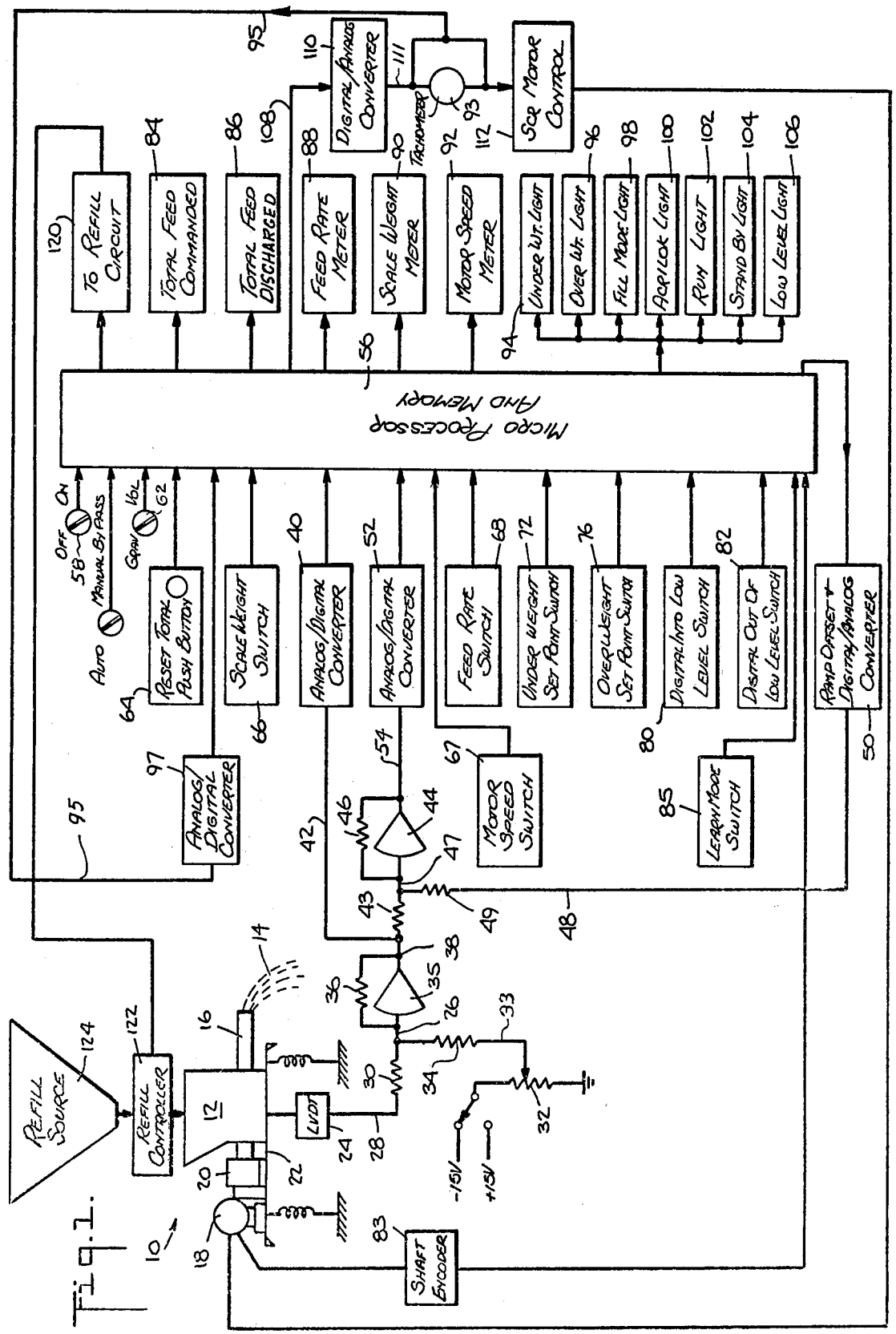
FIG. 1 is a block diagram of the weigh feeder system constructed in accordance with the concepts of the present invention.

The weigh feeder system of this invention, as shown diagrammatically in FIG. 1, includes a feeder assembly indicated generally at 10, which comprises a container 12 with a discharge device connected thereto for feeding the substance 14 out of the container and through a discharge conduit 16. As illustrated, a DC motor 18, connected to a gear-reduction device 20 is provided for driving the discharge device. The feeder assembly may comprise an auger mechanism as disclosed in detail in U.S. Pat. No. 3,186,602 issued June 1, 1965. The entire feeding assembly, including the container, the discharge device, the motor, and the gear-reduction device is mounted on a scale 22, which may comprise a structure as described in detail in U.S. Pat. No. 3,494,507, issued Feb. 10, 1970.

Figure 2:
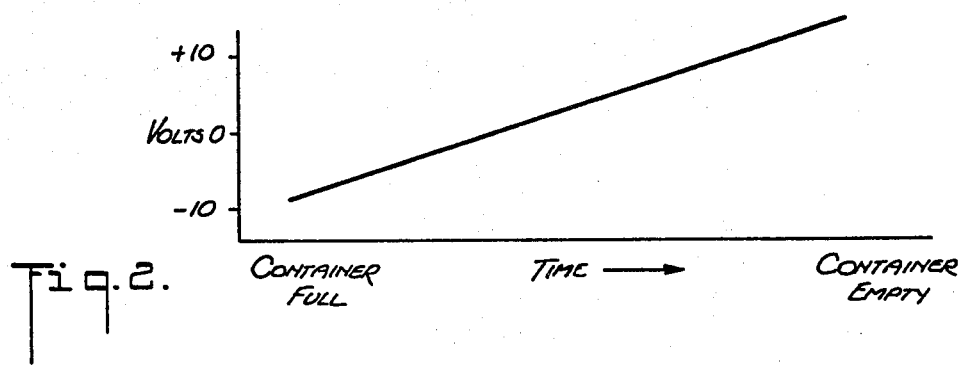
FIG. 2 is a graphic representation of the output voltage with respect to time of one of the amplifier circuits of the present invention.

In accordance with the invention there is provided a detecting device, as for example, a linear variable differential transformer (LVDT) 24, coupled to the scale for providing an electrical signal having an amplitude which is proportional to the weight of the container and its contents. That is, as the contents of the container 12 are discharged, a relative movement occurs between the windings and the core of the LVDT, thereby causing a varying output voltage proportional to the varying weight of the container and its contents. Thus, as the substance is discharged from the container, the LVDT provides an electrical signal which varies in response to such discharge, which may, for example, be a DC voltage with a range of the order of from $\Delta 3$ volts to $\Delta 6$ volts when the material in the container drops from its upper level to its lower level. The signal from the LVDT is applied to a summing junction 26 by a conductor 28, through a resistor 30. Also, applied to the summing junction 26 is an offset potentiometer means 32, by a conductor 33 through a resistor 34, to render the signal from the LVDT symmetrical with respect to zero as measured at 38. The output from the summing junction 26 is applied to an amplifier 35, having a gain potentiometer 36, to produce an output signal at 38, which ranges, for example, from $-10$ volts when the container 12 is full to a $+10$ volts when the container is empty, as shown by the curve in FIG. 2. The output signal from the amplifier 35 is applied to a conventional analog-digital converter (ADC) 40, by way of a conductor 42, wherein the offset amplifier LVDT signal is measured and digitalized and out putted as digital words, corresponding to the total scale weight, i.e. the quantity of material contained in the container 12. Any suitable type of ADC may be employed such as a 12 bit, Model No. 124-10 XW 3, as manufactured by Analog Devices, Inc.

Figure 3:
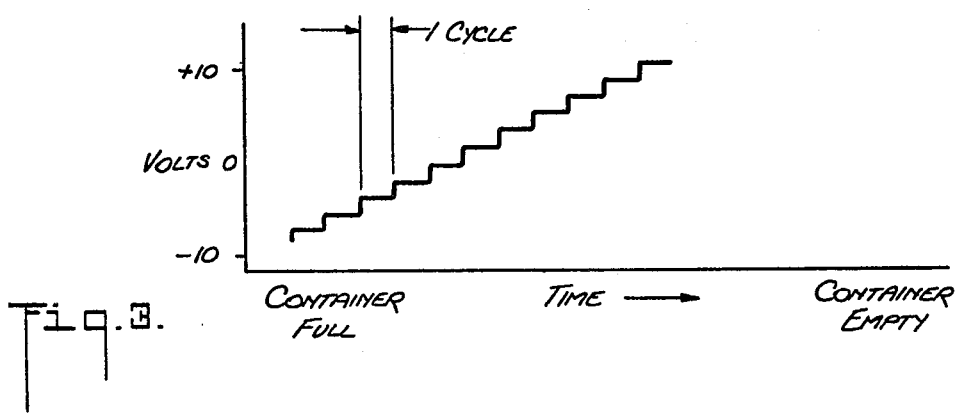
FIG. 3 is a graphic representation of the output of a controlled ramp offset circuit of the present invention.
Figure 4:
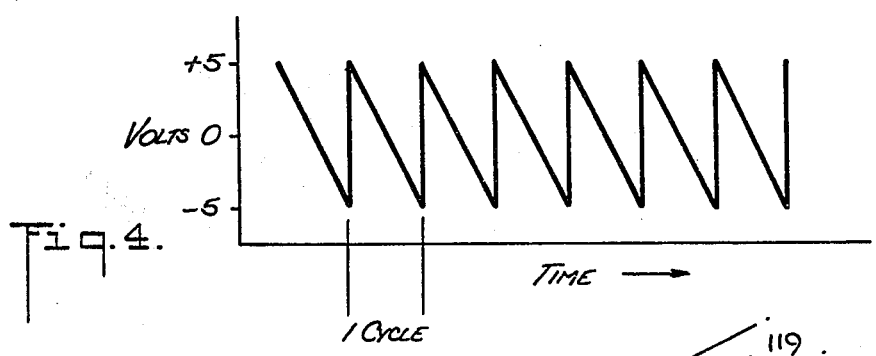
FIG. 4 is a graphic representation of the output of a second amplifier circuit.

In addition, the output signal from the amplifier 35 is applied through a resistor 43 to a second amplifier 44, having a feed back resistor 46, thereby to provide a gain of the order of about a 700 multiple. Applicants have found that a gain of this order is necessary in order to make the desired calculations later in the system, but with such a gain, the voltage would normally be too high, as a practical matter, for computational use, and therefore, a controlled ramp offset signal is also applied to a summing junction 47 by a conductor 48 through a resistor 49. This offset signal is provided by a ramp offset digital-analog converter (DAC) 50, which receives controlled digital words or binary bits and converts them to a step-shaped signal, having a frequency corresponding to one time cycle of operation of the process system, as shown by the curve in FIG. 3. This ramp offset functions in cooperation with the amplifier 44 so that a controlled quantity is subtracted from the input to the amplifier, whereby during one time cycle of operation the output from the amplifier 44 gradually decreases from about $+5$ volts to about $-5$ volts. The ramp offset 50 is a fast acting electronic servo (typically 50 microseconds), and is controlled so that between time cycles of operation its output is adjusted one step as shown in FIG. 3. Thus, at the beginning of the next succeeding time cycle, the output from the amplifier 44 is again about $+5$ volts as shown in FIG. 4. Any suitable type of ramp offset DAC may be employed, such as a 14 bit Model ZD354M1, having a resolution of 1 part in 10,000, as manufactured by Zeltex, Inc., for example. The amplifiers 35 and 44 may be of any suitable type such as Model OPO5EJ, as manufactured by Precision Monolithics, Inc., for example.

The output from the amplifier 44 is applied to a conventional 12 bit analog-digital converter (ADC) 52 by a conductor 54, wherein the output signal from the amplifier is measured and digitalized. The output from the ADC is in the form of digital words corresponding to the scale weight, but greatly amplified.

A binary number system is employed as the code for information handling because of certain advantages hereinafter brought out. Thus, as seen in FIG. 1, the weigh feeder system is provided with a digital computer 56, which includes processing, memory and control systems. Any suitable digital computer may be employed such as a micro processor Model IMP16C/300 and memory Model IMP16P/004P, as manufactured by National Semiconductor Corp., for example.

Still referring to FIG. 1, a plurality of inputs are applied to the processor to control the same. A conventional off-on switch 58 serves to control the main power supply to the processor. A switch 60 is provided whereby the refill sequence may be automatically actuated (switch in "auto") when product level reaches low level, or at any product level (switch in "manual") or, the refill sequence may be bypassed (when switch is in "bypass"). The refill sequence is a procedure wherein the motor speed will not lockout for refill thereby actuating the refill controller until the computer first senses that the scale is undisturbed by foreign influences and secondly, senses that the feed rate agrees with the set feed rate. Input switch 62 serves to convert the system between gravimetric control and volumetric control, as desired. This will be explained more fully hereinafter. A reset total push button switch 64 serves to reset the processor for an entirely new batch of data. Also, there is provided a scale weight switch 66, that inputs into the processor the scale weight, S, which is determined by the size or model of the feeder assembly 10 being employed in the particular installation. This factor is set once and is not adjusted unless a new model or size of feeder assembly is installed.

A motor speed input switch 67 is provided, which is set by the operators at a preselected percent in the range between 0% to 100%, to input into the processor the desired operating speed of the motor when operating volumetrically.

Input switch 68 is actuated by the operator to input the desired feed rate R (LBS./HR) into the processor.

Figure 5:
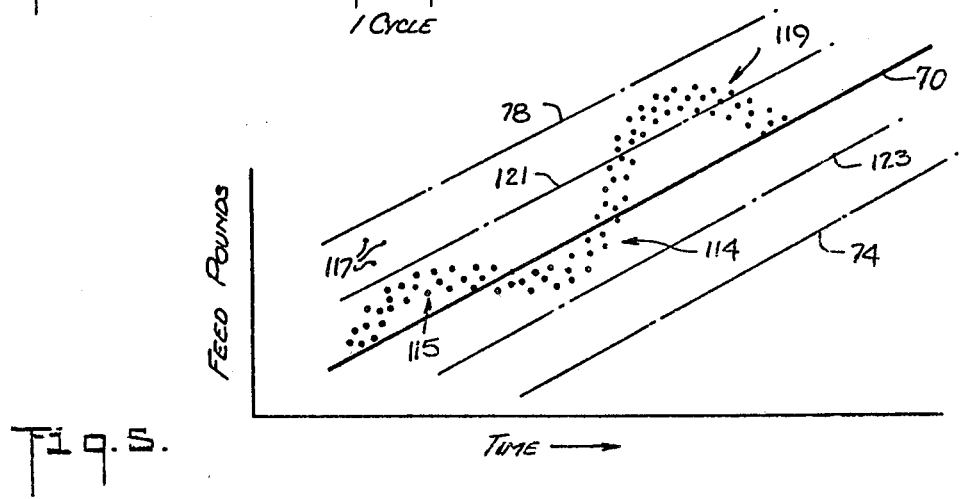
FIG. 5 is a graphical representation of the actual measured feed curve as compared to the desired feed curve.

This is a 16 bit digital word, stored in memory, that represents the desired slope of the feed line or curve 70, FIG. 5. Input switch 72 is also actuated by the operator to input the underweight set point into the processor memory. It represents the selected minimum limit of the feed rate range, as is indicated by the dotted line 74 in FIG. 5. This limit is expressed as a percentage of from 0 to 9.99% below the desired feed rate R. Input switch 76 inputs the overweight set point into memory. It represents the selected maximum limit of the feed range, as is indicated by the dotted line 78 in FIG. 5. This limit also is expressed as a percentage of from 0 to 9.99% above the desired feed rate R.

Still referring to FIG. 1, digital switch 80 is an operator activated switch to input into the memory, the desired minimum or low level of the material in the container 12. The range of this switch is from 0 to 99.9%. Thus, for example, if the operator desires the system to shift into its refill mode when the container 12 is down to 5% of its capacity, he sets the low level switch 80 at 05.0%. Digital input switch 82 is an out of low level switch with a range of from 0 to 99.9% so that the operator can input into memory the desired level for the system to shift out of its refill mode to its normal operative mode. Thus, for example, the operator could set this switch for 90.0%, whereby when the container 12 reaches 90% of its capacity, the system would shift out of its refill mode to its normal operative mode.

Figure 6:
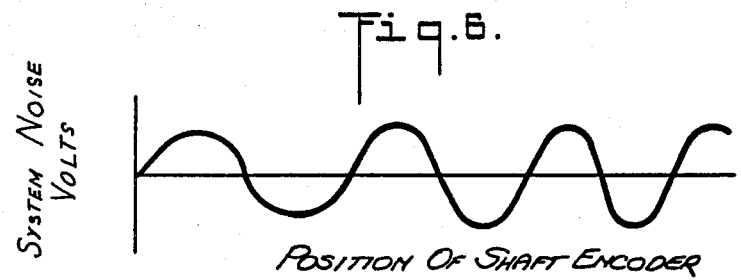
FIG. 6 is a graphic representation of the positional relationship of the shaft encoder with respect to the system noise.
Figure 7:
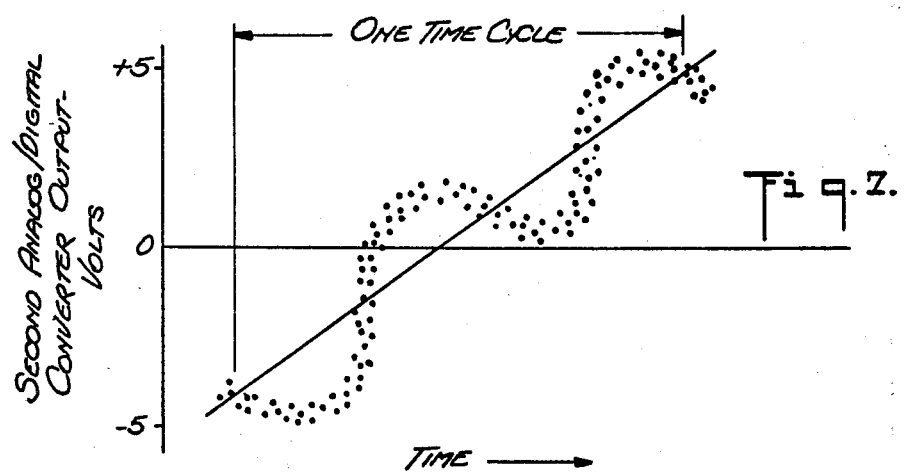
FIG. 7 is a graphic representation of the output of the second analog-digital converter with respect to time, before correction for induced system noises.
Figure 8:
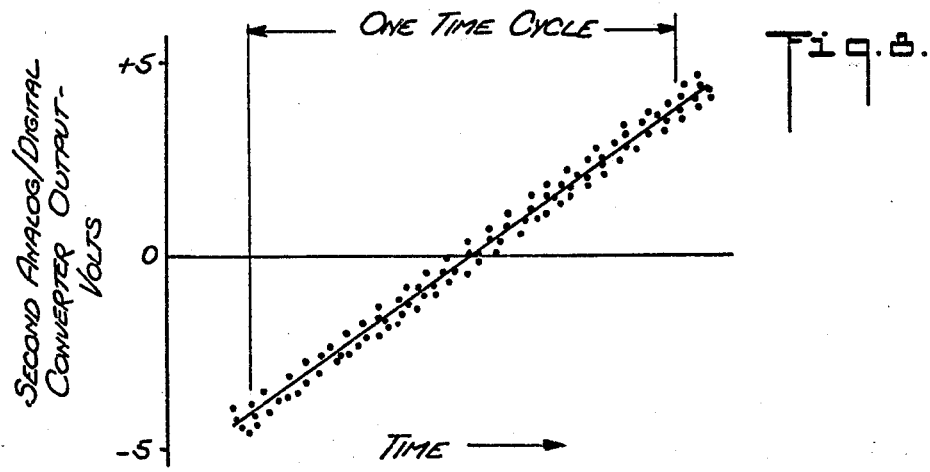
FIG. 8 is a graphic representation of the output of the second analog-digital converter with respect to time, after correction for induced system noises.
Figure 12A:
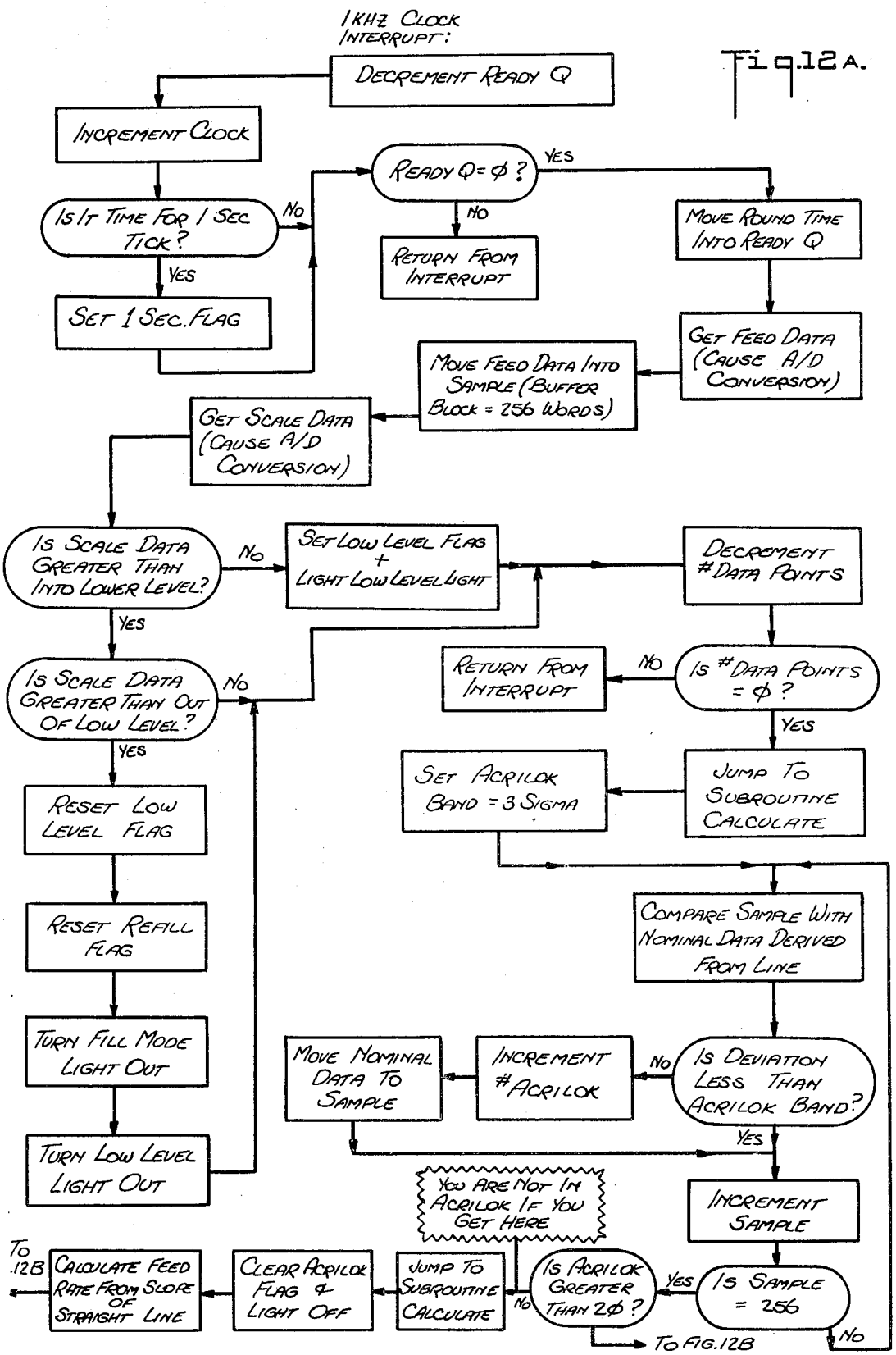

In addition, the processor also receives a signal from a shaft encoder 83. This allows a correlation to be made between the shaft angle and the system noises induced by the movement of the machinery mounted on the scale or movement of the product in the storage hopper. This correlation may then be used as a correction factor, subtracting out noise components due to moving machinery on the scale such as for example, the motor, gear box, augers, as well as movement of the material in the container. The processor 56 is provided with a learn mode input switch 85, which is shiftable between normal operation and learn mode operation. When a new material is going to be processed by the system or when the system is first installed, the system is set in operation, but instead of discharging the substance 14 out of the system, it is collected in a small container, not shown, and retained on the scale 22 so that there is no net loss of weight from the scale. The switch 85 is shifted to its learn mode position. The motor 18 is run throughout its speed range and the shaft encoder 83 senses the shaft angle, at the various speeds of rotation, while the input circuit through the LVDT 24 picks up the noise corresponding to the rotational position of the drive shaft and sends out digital signals to the processor, which are stored in memory. After this information has been stored in memory, the small container is removed from the scale and the switch 85 is shifted to its normal operation. FIG. 6 illustrates the positional relationship of the shaft encoder 83 with respect to the induced system noise for a particular speed during the learn mode of operation. FIG. 7 illustrates the output of the ADC 52 with respect to time, before it is corrected for the induced system noises. Processor 56, as another operation thereof, subtracts the system noise stored data from the data received from the ADC 52 to present corrected values of this information for processing. FIG. 8 illustrates the corrected output from the ADC 52 for one time cycle of operation. Any suitable type of shaft encoder may be employed such as a Series 2500, Optical Encoder, as manufactured by Renco Corporation.

The microprocessor 56 has, as an output, a display device 84 which indicates the total feed commanded. This device indicates the total feed asked for by the operators over a relatively long period of time. Thus, the processor, as one operation thereof, receives the selected feed rate R from the input switch 68 and integrates it with respect to the elapsed time and continuously displays the total feed commanded, in pounds. As another output there is provided a display device 86 which indicates the actual total feed discharged from the feeder assembly 10. Thus, the processor, as one operation thereof, receives a signal from the ADC 40 corresponding to the total scale weight, which indicates the quantity of material remaining in the container. This signal represents the amount of weight of material in the feeder 12. Any change in this signal, except during refill, represents the amount of material fed. These changes are totalled by the processor to give the actual total feed, in pounds. During refill the amount of material fed is computed by the processor from the reading of the feed rate meter and the time it takes to refill. When refill is completed the signal from the ADC 40 is again used to compute the total amount of material fed. The operators can compare the actual total feed, as displayed at 86, with the total feed commanded, as displayed at 84, to determine how the system is functioning and, if necessary, take corrective action.

A feed rate display device, such as a four digit meter, 88, for example, shows the actual feed rate in pounds per hour of the feeder assembly. Thus, the processor, as another operation thereof, receives the amplified scale weight signal from the ADC 52 and corrects this signal as pointed out hereinbefore, and then differentiates the signal with respect to time to produce a signal indicative of the present rate of feed. This can be visually compared to the desired feed rate as set by the input switch 68 to determine possible malfunctions in the system.

A scale weight display device, such as a three digit meter 90, for example, is provided to indicate the actual percentage of product remaining in the container 12 on the scale 22. Thus, the processor, as still another operation thereof, receives a signal from the ADC 40 corresponding to the weight on the scale 22 and computes the actual percentage of material remaining in the container 12. Next, there is provided, as another output of the processor 56, a three digit motor speed meter 92 which indicates the actual speed of the motor 18. That is, the processor receives a signal from a tachometer 93, indicating the speed of the motor 18, by a conductor 95 through a conventional analog-digital converter 97, and outputs a motor speed on meter 92. While this speed is usually relatively constant, it may vary to some extent over a long period of time. It is advantageous for the operator to know, as any sudden variations may indicate a blockage of material in the system.

In addition, there are provided operational and warning indicators, such as lights, buzzers, or the like, for example, for purposes of keeping the operators informed. An underweight light 94 indicates when the actual feed rate, as indicated by the meter 88, falls below the underweight set point 72, and an overweight light 96 indicates when the actual feed rate exceeds the overweight set point 76. That is, when the actual feed rate falls below the line 74, FIG. 5, which is set by the underweight set point switch 72, the underweight light 94 is actuated, and when the actual feed rate is above the line 78, FIG. 5, which is set by the overweight set point switch 76, the overweight light 96 is actuated. Preferably, there is a preselected time delay period of from about 0 to about 3 minutes delay after the feed rate meter 88 indicates an overweight or an underweight condition before the warning lights are actuated. Light 98 shows when the system is in its refill mode, i.e. when the container 12 is being refilled. The light 100 indicates that the system is in its ACRILOK mode. This mode of operation will be explained more fully hereinafter. Run light 102 indicates that the system is in operation and standby light 104 indicates that the system power has been applied, but all machinery is stopped. The light 106 indicates that the bin 12 is in its low level condition.

A control output 108 from the processor 56 is applied to a digital-analog converter (DAC) 110. Any suitable type of DAC may be employed, such as a 10 bit Model AD7520L, as manufactured by Analog Devices, Inc., for example. In the DAC, the digital pulses are converted to an analog signal, which is applied to the tachometer 93 and an SCR motor control 112. Any suitable type of motor control may be employed such as Acrison, Inc.'s Model ACR100BTG, for example. This controller produces an output which is applied to the motor 18 to control the speed thereof, and thereby control the discharge rate of the material from the feeder assembly 10.

In operation, the operator must determine whether he wishes to operate in the volumetric mode or the gravimetric mode. If the volumetric mode is selected, then the operator set the motor speed switch 67 to the desired motor speed. In this mode of operation, the output of the processor is a digital word conveyed by conductor 108 to the DAC 110. The DAC causes a voltage from 0 to 6 volts to appear on conductor 111 and the SCR motor control adjusts the speed of the DC motor 18 until the output of the tachometer 93 exactly equals the voltage on the conductor 111. While this mode of operation is desirable at certain times, it does not provide as high a degree of accuracy as the gravimetric mode and, consequently, the gravimetric mode is predominantly employed.

In operation, when the operator sets the switch 62 to the gravimetric mode of operation, the operator then sets the feed rate switch 68 to the desired feed rate R (LBS./HR), which, as discussed hereinbefore, determines the slope of the feed curve or line 70, FIG. 5. The processor then computes the conversion time which may be, for example, T=(2.5) S/R in seconds, where 'S is the scale weight as set by switch 66, R is the desired feed rate set by switch 68, and 2.5 is a constant which, when combined with S/R, produces the conversion time in seconds. The conversion time is the time for each cycle of operation, as shown in FIGS. 3 and 4, during which many samples of the input signal are taken and one calculation of feed rate is made. Next, the ramp offset 50 is energized which, as pointed out hereinbefore, limits the range of the output 54 of the amplifier 44 to between +5 volts and −5 volts. Initially, it sets said output at about +5 volts. Next, the processor starts the conversion time. The conversion time T, may, for example, be about 250 milliseconds. A plurality of samples are taken based on the input from the ADC 52, which may for example, be about 100 during each conversion time. The conversion time, T, or time to complete one cycle of operation, is selected to be within the range of from about $\frac{1}{4}$ seconds minimum to a maximum of from about 100 to 200 seconds. During this cycle, the output from the amplifier 44 moves from about +5 volts to about −5 volts. Each sample is stored in memory. The samples, generally illustrated in FIG. 5 by dots, form the actual feed curve 114. One of the most important operations of the processor is to compute a regression analysis on these samples with respect to the conversion time T, and thence compute the RMS error on T.

FIG. 5 illustrates an upper 3 RMS error line at 121 and a lower 3 RMS error line at 123. If less than 20, for example, sample data points exceed 3 RMS error in either direction, as indicated at 115 in FIG. 5, regression on T is recomputed with the data points exceeding 3 RMS, as indicated at 117, excluded. Thence, the computed feed-rate, or, slope of the actual feed curve is compared with the slope of the desired or set point feed line, and a corresponding correction command is outputted at 108 to adjust the motor control 112, thereby to adjust the actual rate of discharge of the material from the feeder assembly 10. This time cycle of operation is continuously repeated to continuously adjust the motor control 112.

If more than 20, for example, sample data points exceed 3 RMS error in either direction, as indicated at 119 in FIG. 5, the system is changed into its ACRILOK mode. That is, the ACRILOK light 100 is energized and the output command 108 to the DAC 110 and the motor control 112 is not updated, but continues in its present state. That is, the processor continues to receive sample signals from the ADC 52 and compute the regression analysis thereof, but no correction command is outputted at 108. The feed rate meter 88 is also locked at the last control data point. The feed system remains in a locked condition until in a subsequent time cycle of operation less than 20 data points exceed 3 RMS error, and then the system is returned to its normal operating mode and the correction command is again outputted at 108.

As still another operation of the processor, the total feed commanded, as indicated at 84, is compared to the actual total feed, as indicated at 86, periodically, such as every 5 or 10 minutes, for example. If there is a deviation exceeding predetermined limits, the processor modifies the aforementioned command output at 108 to gradually correct the actual feed to the total feed. This is programmed to take from about 5 minutes to about 10 minutes, thereby to avoid sharp fluctuations in the feed rate command, but nevertheless, obtain as close as possible the total feed selected over a long period of time.

A further operation of the processor, is to determine when the scale weight, as indicated by the meter 90, drops to a predetermined low level, as set by the low level switch 80, and then search for an "on rate" condition. That is, the output signal outputted at 88 is monitored until the difference between it and the feed rate switch 68 is less than a predetermined error limit. Thence, the system is changed into its refill mode wherein the output command 108 and feed rate meter 88 are not updated, but are retained in its present state, similar to its operation as described hereinbefore in connection with the ACRILOK mode. At the same time, a command is outputted to a refill circuit 120, which sends a signal to a refill controller 122 that controls the flow of material from a refill source 124 to the container 12. The controller 122 could be an AC motor when handling dry particulate material or could be a valve when handling liquids.

The system remains in the refill mode until the processor detects that the container 12 is refilled, as indicated by the scale weight meter 90, and as selected by the out of low level switch 82. At this time, the processor outputs a signal to the refill circuit 120 which, in turn, directs the refill controller 122 to discontinue refilling the container 12. The processor then returns the system to its normal operational mode.

FIGS. 9 to 14 are various flow charts of the computer 56. Thus, FIG. 9 is a flow chart showing the wait subroutine, and FIG. 10 is a flow chart of the second interrupt subroutine, which is a display type subroutine. FIG. 11 is a flow chart of the derive subroutine wherein the normal conversion time is calculated. FIGS. 12A, 12B and 12C combine to form a flow chart of the main routine of the computer 56. FIGS. 13 and 14 are flow charts of the calculate and learn mode subroutines, respectively.

| Initial conditions and assumptions are, as follows: | |
|---|---|
| GRAV/VOL. | = GRAV. |
| ON/OFF | = OFF |
| AUTO/MAN./BY-PASS | = AUTO |
| SCALE WEIGHT | = 1000. lbs. |
| FEED RATE SET POINT | = 200 LBS./HR. |
| INTO LOW LEVEL | = 20% |
| OUT OF LOW LEVEL | = 80% |
| MOTOR SPEED | = 50% |
| ASSUME MAX. FEED RATE OF MACHINE | = 2000 LBS./HR. |
| REAL TIME CLOCK RATE | = 1 KHZ (Clock causes interrupt) |

Flags set by hardware:
Grav. Flag
Run Flag
Learn Flag
{By-Pass Flag}
{Man. Flag}
Reset Total Flag Number of Samples per slope calculation =256. The time between samples is chosen so that you have covered about 60% of the range of the ramp offset 50 for each slope calculation. The ramp offset is reset for each new slope calculation. Thus, the lower the set point the longer it takes to calculate the slope.

The following is a program with descriptive comments for carrying out the basic operations of the computer 56:

```
*B

*L   T/2

*T   T/2

END ?
            177554        OUT    =   177554   )
                                              )
            177552        DATA   =   177552   )
                                              )
            177554        OFFSET =   177554   )
                                              )
            177550        SET    =   177550   )
                                              )
            177550        LKS    =   177550   )
                                              )
            040200        ONEF   =   040200   )
                                              )
            040400        TWOF   =   040400   )
                                              )
            040700        SIXF   =   040700   )
                                              )
            000004        WAITR  =   4        )
                                              )
            000011        READ   =   11       ) DEFINITIONS OF
                                              )
            000012        WRITE  =   12       ) CONSTANTS, ADDRESSES
                                              )
            000000        R0=%0              ) AND REGISTERS.
                                              )
            000001        R1  = %1             )
                                              )
            000002        R2  =%2              )
                                              )
            000003        R3  =%3              )
                                              )
            000004        R4  =%4              )
                                              )
            000005        R5  =%5              )
                                              )
            000006        R6  =%6              )
                                              )
            000006        SP  =%6              )
                                              )
            000007        PC  =%7              )
```

```
        ∅57452    $ADR=57452    )
                                )
        ∅6∅2∅6    $CMR=6∅2∅6    )
                                )
        ∅635∅∅    $DVR=635∅∅    )
                                )
        ∅61664    $GCO=61664    )
                                )
        ∅64146    $IR=64146     ) LINKS TO FLOATING POINT
                                )
        ∅64232    $MLI=64232    ) MATH PACKAGE (FPMP-WRITTEN
                                )
        ∅64412    $MLR=64412    ) BY D.E.C.)
                                )
        ∅64772    $NGR=64772    )
                                )
        ∅65146    $POLSH=65146  )
                                )
        ∅6∅264    $RC1=6∅264    )
                                )
        ∅65∅24    $R1=65∅24     )
                                )
        ∅57446    $SBR=57446    )

∅∅∅174    .=174

∅∅∅174  ∅5∅722    .WORD INT     ) SET UP 1KHZ. CLOCK INTERRUPT
                                )
∅∅∅176  ∅∅∅34∅    .WORD ∅∅∅34∅ ) VECTOR

∅5∅∅∅∅    .=5∅∅∅∅

∅5∅∅∅∅  ∅1∅767    START: MOV PC, STKST )
                                       )
        ∅∅3642                         )
                                       )
∅5∅∅∅4  ∅167∅6           MOV STKST, SP ) -; STACK POINTER IS
                                       )
        ∅∅3636                         )   NOW POINTING
                                       )
∅5∅∅1∅  ∅∅5746           TST (SP) →    )   TO STKST

∅5∅∅12  ∅137∅∅           MOV @ #177552,R∅
        177552

∅5∅∅16  ∅52767           BIS #2, SET   ) ;INITIALIZE
                                       )
        ∅∅∅∅∅2                         )   OFFSET
                                       )
        127524                         )   VOLTAGE TO
                                       )
∅5∅∅24  ∅12767           MOV #177777,OFFSET ) ZERO (IN
                                            )
                                            ) COMPLEMENT
                                            )
                                            ) FORM
```

```
                    177777
                    127522                          );INITIALIZE
                                                    )
ø5øø32              øø5ø67      CLR SET             ) CONTROL
                    127512                          ) VOLTAGE TO
                                                    )
                    RQ @ GE 001                     ) ZERO(IN
                                                    )
ø5øø36              ø12767      MOV #177777,OFFSET  ) COMPLEMENT
                                                    ) FORM)
                    177777
                    12751ø                          )INITIALIZE
                                                    )
ø5øø44              øøøøø4      IOT                 )TELETYPE
                                                    )
ø5øø46              øbøøøø      .WORD ø             )THROUGH
                                                    )
ø5øø5ø              øø2         .BYTE 2,ø           )IOX (IOX IS
                                                    )
                                                    )WRITTEN BY
                                                    )
                                                    )D.E.C.)

ø5øø51              øøø
ø5øø52              øøøøø4      IOT                 )SETS UP
                                                    )CONTROL P
ø5øø54              ø5ø6øø      .WORD ASK           ) RETURN
                                                    )ADDRESS
ø5øø56              øø3         .BYTE 3,ø           )
ø5øø57              øøø
ø5øø6ø              ø127ø1 ASK: MOV  #TABLE1, R1; GET ADDRESS OF
                                                    TABLE OF
                                                    QUESTIONS
                    ø5ø4øø
ø5øø64              ø12767      MOV #9., LOOP; SET UP LOOP FOR
                                                  NINE QUESTIONS
                    øøøø11
                    øø3552
ø5øø72              ø127øø      MOV #MTABLE,Rø;GET ADDRESS OF
                                                TABLE CONTAINING
                                                POINTERS TO THE 9
                                                QUESTIONS
```

```
       Ø5Ø356
Ø5ØØ76  Ø12Ø67   MORE:     MOV (RØ)+,WBUFFER
        ØØØØØ2

Ø5Ø1Ø2  ØØØØØ4             IOT                )
                                               ) PRINT THE
Ø5Ø1Ø4  ØØØØØØ   WBUFFER:          .WORD Ø    ) QUESTION
                                               )
Ø5Ø1Ø6  Ø12                .BYTE WRITE, 1     )

Ø5Ø1Ø7  ØØ1

Ø5Ø11Ø  ØØØØØ4             IOT                )
                                               ) GET A REPLY
Ø5Ø112  Ø5Ø25Ø             .WORD BUFFER       )
                                               )
Ø5Ø114  Ø11                .BYTE READ,Ø       )

Ø5Ø115  ØØØ

Ø5Ø116  ØØØØ4   WAITT:     IOT                ) WAIT UNTIL
                                               ) REPLY IS
Ø5Ø12Ø  Ø5Ø116             .WORD WAITT        ) GIVEN BY
                                               ) OPERATOR AT
Ø5Ø122  ØØ4                .BYTE WAITR,Ø      ) TTY.

Ø5Ø123  ØØØ

Ø5Ø124  Ø12746             MOV #BUFFER+6,(SP)-; PUT ADDRESS
                                                 OF REPLY ON
        Ø5Ø256                                   STACK

Ø5Ø13Ø  Ø16746             MOV BUFFER +4,(SP)-; PUT LENGTH
                                                 OF REPLY ON
                                                 STACK
        ØØØ12Ø

Ø5Ø134  162716             SUB #2, (SP)
        ØØØØØ2

Ø5Ø14Ø  ØØ5Ø46             CLR (SP)- )
                                      ) FREE FORMAT CONVERSION
Ø5Ø142  ØØ5Ø46             CLR (SP)- )

Ø5Ø144  ØØ4767             JSR PC,$RCI; CONVERT REPLY
                                         TO FLOATING POINT
        Ø1Ø114

Ø5Ø15Ø  Ø12621             MOV (SP)+,(R1)+)
                                           )STORE REPLY IN
Ø5Ø152  Ø12621             MOV (SP)+,(R1)+)TABLE 1.
```

| | | | |
|---|---|---|---|
| 050154 | 005367 | DEC LOOP | |
| | 003464 | | |
| 050160 | 001346 | BNE MORE | |
| 050162 | 005046 | CLR (SP)- | |
| 050164 | 012746 | MOV #042722,(SP)- | ) PUT FLTING PT. 1680 ON THE STACK |
| | 042722 | | |
| | RQ@GE 002 | | |
| 050170 | 012701 | MOV #TABLE 1+14,R1 | |
| | 050414 | | |
| 050174 | 014146 | MOV (R1)-, (SP)- | ) |
| 050176 | 014146 | MOV (R1)-, (SP)- | ) CALCULATE |
| 050200 | 014146 | MOV (R1)-, (SP)- | ) # SAMPLES/SEC. |
| 050202 | 014146 | MOV (R1)-, (SP)- | ) |
| 050204 | 004467 | JSR R4, $POLSH | ) |
| | 014736 | | ) |
| 050210 | 063500 | $DVR | ) |
| 050212 | 050214 | .WORD .+2 | |
| 050214 | 011667 | MOV (SP), HOLD8 | ) |
| | 003450 | | )STORE #SAMPLES/ SEC |
| 050220 | 016667 | MOV 2(SP), HOLD9 | ) |
| | 000002 | | |
| | 003444 | | |
| 050226 | 004467 | JSR R4, $POLSH | ) |
| | 014714 | | ) DIVIDE SAMPLES/ SEC BY 1680 TO GIVE THE # OF INTERRUPTS PER SAMPLE |
| 050232 | 063500 | $DVR | ) |
| 050234 | 065024 | $RI | ) |
| 050236 | 050240 | .WORD .+2 | |
| 050240 | 012667 | MOV (SP)+,INTSAM; STORE RESULT. | |
| | 003430 | | |
| 050244 | 000167 | JMP INIT; GO TO THE INITIALIZATION SECTION | |
| | 002126 | | |
| 050250 | 000100 | BUFFER: 100 | ) |

| | | | | |
|---|---|---|---|---|
| 050252 | 000000 | | 0 | ) BUFFER FOR |
| 050254 | 000000 | | 0 | ) REPLYS TO |
| | | | | ) QUESTIONS |
| | 050356 | | .=.+100 | |
| 050356 | 050450 | MTABLE: | TABLE | ) |
| 050360 | 050472 | | TABLE2 | ) |
| 050362 | 050506 | | TABLE3 | ) |
| 050364 | 050522 | | TABLE4 | ) |
| 050366 | 050544 | | TABLE5 | )POINTERS TO |
| | | | | )THE QUESTIONS |
| 050370 | 050570 | | TABLE6 | ) |
| 050372 | 050604 | | TABLE7 | ) |
| 050374 | 050630 | | TABLE8 | ) |
| 050376 | 050662 | | TABLE9 | ) |
| | 050450 | TABLE1: | .=.+50 | |
| 050450 | 000014 | TABLE: | TABLE2-TABLE-6 | |
| 050452 | 000000 | | 0 | |
| 050454 | 000014 | | TABLE2-TABLE-6 | THE QUESTIONS |
| 050456 | 015 | | .BYTE 15,12 | |
| 050457 | 012 | | | |
| 050460 | 106 | | .ASCII 'FEED V/S='; | VOLTS/SECOND FEED RATE |
| 050461 | 105 | | | |
| 050462 | 105 | | | |
| 050463 | 104 | | | |
| 050464 | 040 | | | |
| 050465 | 126 | | | |
| 050466 | 057 | | | |
| 050466 | 003 | | | |
| 050467 | 123 | | | |
| 050470 | 075 | | | |
| | 050472 | .EVEN | | |
| 050472 | 000006 | TABLE2: | TABLE3-TABLE2-6 | |
| 050474 | 000000 | | 0 | |

| | | | |
|---|---|---|---|
| 050476 | 000006 | | TABLE3-TABLE2-6 |
| 050500 | 124 | | .ASCII 'TIME='; SMALL SAMPLE TIME IN SECONDS |
| 050501 | 111 | | |
| 050502 | 115 | | |
| 050503 | 105 | | |
| 050504 | 075 | | |
| | 050506 | | .EVEN |
| 050506 | 000006 | TABLE3: | TABLE4-TABLE3-6 |
| 050510 | 000000 | | 0 |
| 050512 | 000006 | | TABLE4-TABLE3-6 |
| 050514 | 043 | | .ASCII '#SAM='; #SAMPLES PER SMALL SAMPLE TIME |
| 050515 | 123 | | |
| 050516 | 101 | | |
| 050517 | 115 | | |
| 050520 | 075 | | |
| | 050522 | .EVEN | |
| 050522 | 000014 | TABLE4: | TABLE5-TABLE4-6 |
| 050524 | 000000 | | 0 |
| 050526 | 000014 | | TABLE5-TABLE4-6 |
| 050530 | 105 | | .ASCII 'ERR BND V/S='; SMALL SAMPLE ERROR BAND IN VOLT/SECOND |
| 050531 | 122 | | |
| 050532 | 122 | | |
| 050533 | 040 | | |
| 050534 | 102 | | |
| 050535 | 116 | | |
| 050536 | 104 | | |
| 050537 | 040 | | |
| 050540 | 126 | | |

| | | | |
|---|---|---|---|
| 050541 | 057 | | |
| 050542 | 123 | | |
| 050543 | 075 | | |
| | 050544 | .EVEN | |
| 050544 | 000016 | TABLE5: | TABLE6-TABLE5-6 |
| 050546 | 000000 | | 0 |
| 050550 | 000016 | | TABLE6-TABLE5-6 |
| 050552 | 043 | | .ASCII '#SM SAM/LARGE=';# OF SMALL SAMPLES PER LARGE SAMPLE TIME. |
| 050553 | 123 | | |
| 050554 | 115 | | |
| 050555 | 040 | | |
| 050556 | 123 | | |
| 050557 | 101 | | |
| 050560 | 115 | | |
| 050561 | 057 | | |
| 050562 | 114 | | |
| 050563 | 101 | | |
| | RQ@GE | 004 | |
| 050564 | 122 | | |
| 050565 | 107 | | |
| 050566 | 105 | | |
| 050567 | 075 | | |
| | 050570 | .EVEN | |
| 050570 | 000006 | TABLE6: | TABLE7-TABLE6-6 |
| 050572 | 000000 | | 0 |
| 050574 | 000006 | | TABLE7-TABLE6-6 |
| 050576 | 105 | | .ASCII 'ERR K='; OUTPUT ERROR CONSTANT "K" THIS IS SYSTEM GAIN. |

| | | | |
|---|---|---|---|
| 050577 | 122 | | |
| 050600 | 122 | | |
| 050601 | 040 | | |
| 050602 | 113 | | |
| 050603 | 075 | | |
| | 050604 | .EVEN | |
| 050604 | 000016 | TABLE7: | TABLE8-TABLE7-6 |
| 050606 | 000000 | | 0 |
| 050610 | 000016 | | TABLE8-TABLE7-6 |
| 050612 | 043 | | .ASCII '#SM SAM B4 SW=';# OF SMALL SAMPLES BEFORE SWITCHING. |
| 050613 | 123 | | |
| 050614 | 115 | | |
| 050615 | 040 | | |
| 050616 | 123 | | |
| 050617 | 101 | | |
| 050620 | 115 | | |
| 050621 | 040 | | |
| 050622 | 102 | | |
| 050623 | 064 | | |
| 050624 | 040 | | |
| 050625 | 123 | | |
| 050626 | 127 | | |
| 050627 | 075 | | |
| | 050630 | .EVEN | |
| 050630 | 000024 | TABLE8: | TABLE9-TABLE8-6 |
| 050632 | 000000 | | 0 |
| 050634 | 000024 | | TABLE9-TABLE8-6 |
| 050636 | 123 | | .ASCII 'STARTUP ERR BND V/S=' |
| 050637 | 124 | | |
| 050640 | 101 | | |

| | | | |
|---|---|---|---|
| 050641 | 122 | | |
| 050642 | 124 | | |
| 050643 | 125 | | |
| 050644 | 120 | | |
| 050645 | 040 | | |
| 050646 | 105 | | |
| 050647 | 122 | | |
| 050650 | 122 | | |
| 050651 | 040 | | |
| 050652 | 102 | | |
| 050653 | 116 | | |
| | RQ@GE | 005 | |
| 050654 | 104 | | |
| 050655 | 040 | | |
| 050656 | 126 | | |
| 050657 | 057 | | |
| 050660 | 123 | | |
| 050661 | 075 | | |
| 050662 | | | .EVEN |
| 050662 | 000024 | TABLE9: | TABLEZ-TABLE9-6 |
| 050664 | 000000 | | 0 |
| 050666 | 000024 | TABLEZ | TABLEZ-TABLE9-6 |
| 050670 | 043 | .ASCII | '/SM SAM IN STARTUP=' |
| 050671 | 123 | | |
| 050672 | 115 | | |
| 050673 | 040 | | |
| 050674 | 123 | | |
| 050675 | 101 | | |
| 050676 | 115 | | |
| 050677 | 040 | | |
| 050700 | 111 | | |
| 050701 | 116 | | |
| 050702 | 040 | | |

| | | | |
|---|---|---|---|
| 050703 | 123 | | |
| 050704 | 124 | | |
| 050705 | 101 | | |
| 050706 | 122 | | |
| 050707 | 124 | | |
| 050710 | 125 | | |
| 050711 | 120 | | |
| 050712 | 075 | | |
| | 050714 | .EVEN | |
| 050714 | 000 | TABLEZ: | .BYTE 0 |
| | 050716 | | .EVEN |
| 050716 | 000167 | LINK: | JMP RESET |
| | 001212 | | |
| 050722 | 005737 | INT: | TST @#177552; START OF INTERRUPT SERVICE. |
| | 117552 | | |
| 050726 | 005367 | | DEC INTS       ) |
| | 002556 | | ) IS IT TIME TO SAMPLE? |
| 050732 | 001401 | | BEQ SAMPLE     ) |
| 050734 | 000002 | | RTI |
| 050736 | 004767 | SAMPLE: | JSR PC, SAVE |
| | 001366 | | |
| 050742 | 005267 | | INC SET; START A/D CONVERSION |
| | 126602 | | |
| 050746 | 105767 | CK: | TSTB SET |
| | 126576 | | |
| 050752 | 100375 | | BPL CK |
| 050754 | 016700 | | MOV DATA, R0; GET THE A/D OUTPUT |
| | 126572 | | |
| 050760 | 005100 | | COM R0 |
| | RQ@GE | 006 | |
| 050762 | 016767 | | MOV INTSA, INTS; RESET # INTERRUPTS/SAMPLE. |

|        |        |       |                |                              |
|--------|--------|-------|----------------|------------------------------|
|        | ØØ2524 |       |                |                              |
|        | ØØ252Ø |       |                |                              |
| Ø5Ø77Ø | Ø227ØØ |       | CMP #98Ø.,RØ   | ) IS THE A/D OUT-            |
|        |        |       |                | ) PUT GREATER THAN           |
|        | ØØ1724 |       |                | ) 9 VOLTS? IF                |
|        |        |       |                | ) YES RESET.                 |
| Ø5Ø774 | ØØ375Ø |       | BLE LINK       | )                            |
| Ø5Ø776 | Ø6ØØ67 |       | ADD RØ,Y+2     | )                            |
|        |        |       |                | ) SUM THE Y VALUE            |
|        | ØØ2514 |       |                | ) FOR THE                    |
|        |        |       |                | ) REGRESSION.                |
| Ø51ØØ2 | ØØ5567 |       | ADC Y          | )                            |
|        | ØØ25Ø6 |       |                |                              |
| Ø51ØØ6 | Ø167Ø1 |       | MOV X, R1      | )                            |
|        |        |       |                | ) MULTIPLY THE X             |
|        | ØØ25Ø6 |       |                | ) BY THE Y                   |
|        |        |       |                | )                            |
| Ø51Ø12 | ØØ4767 |       | JSR PC,MULTY   | )                            |
|        | ØØ1Ø62 |       |                |                              |
| Ø51Ø16 | Ø6Ø167 |       | ADD R1,XY+2    | )                            |
|        |        |       |                | )                            |
|        | ØØ2514 |       |                | )                            |
|        |        |       |                | ) SUM THE XY VALUE           |
| Ø51Ø22 | ØØ5567 |       | ADC XY         | ) FOR THE                    |
|        |        |       |                | ) REGRESSION.                |
|        | ØØ25Ø6 |       |                | )                            |
| Ø51Ø26 | Ø6ØØ67 |       | ADD RØ,XY      | )                            |
|        | ØØ25Ø2 |       |                |                              |
| Ø51Ø32 | ØØ5367 |       | DEC X; REDUCE X VALUE BY 1 |                  |
|        | ØØ2462 |       |                |                              |
| Ø51Ø36 | ØØ14Ø2 |       | BEQ CALC; IF X=Ø IT IS TIME TO |              |
|        |        |       |     CALCULATE THE SLOPE |                      |
| Ø51Ø4Ø | ØØ4767 |       | JSR PC,RESTORE |                              |
|        | ØØ1312 |       |                |                              |
| Ø51Ø44 | Ø16767 | CALC: | MOV N,X; RESET THE X VALUE |                  |
|        | ØØ25ØØ |       |                |                              |
|        | ØØ2446 |       |                | )                            |
| Ø51Ø52 | Ø16767 |       | MOV Y,YC       | )                            |
|        |        |       |                | )                            |
|        | ØØ2436 |       |                | ) STORE THE                  |
|        |        |       |                | ) ≤Y                         |
|        | ØØ2464 |       |                | )                            |
| Ø51Ø6Ø | Ø16767 |       | MOV Y+2,YC+2   | )                            |

|        |        |         |                  |                                        |
|--------|--------|---------|------------------|----------------------------------------|
|        | ØØ2432 |         |                  |                                        |
|        | ØØ246Ø |         |                  |                                        |
| Ø51Ø66 | Ø16767 |         | MOV XY,XYC       | )                                      |
|        | ØØ2442 |         |                  | ) STORE THE $\Sigma$X                  |
|        | ØØ2444 |         |                  | )                                      |
| Ø51Ø74 | Ø16767 |         | MOV XY+2,XYC+2   | )                                      |
|        | ØØ2436 |         |                  |                                        |
|        | ØØ244Ø |         |                  |                                        |
| Ø511Ø2 | ØØ5Ø67 |         | CLR XY           | )                                      |
|        | ØØ2426 |         |                  | )                                      |
| Ø511Ø6 | ØØ5Ø67 |         | CLR XY+2         | ) RESET $\Sigma$XY AND                 |
|        | ØØ2424 |         |                  | ) $\Sigma$Y FOR NEXT SAMPLE PERIOD.    |
| Ø51112 | ØØ5Ø67 |         | CLR Y            | )                                      |
|        | ØØ2376 |         |                  | )                                      |
| Ø51116 | ØØ5Ø67 |         | CLR Y+2          | )                                      |
|        | ØØ2374 |         |                  |                                        |
| Ø51122 | Ø16746 |         | MOV N1+2,(SP)-   | )                                      |
|        | ØØ2426 |         |                  | ) PUT # SAMPLES ON THE STACK.          |
|        | RQ@GE  | ØØ7     |                  | )                                      |
| Ø51126 | Ø16746 |         | MOV N1,(SP)-     | )                                      |
|        | ØØ242Ø |         |                  |                                        |
| Ø51132 | Ø167ØØ |         | MOV XYC, RØ      | )                                      |
|        | ØØ24Ø2 |         |                  | )                                      |
| Ø51136 | Ø167Ø1 |         | MOV XYC+2,R1     | )                                      |
|        | ØØ24ØØ |         |                  | ) CONVERT $\Sigma$XY TO A FLOATING POINT |
| Ø51142 | ØØ4767 |         | JSR PC,DFLOAT    | ) # AND PUT IT ON THE STACK.           |
|        | ØØØ62Ø |         |                  | )                                      |
| Ø51146 | ØØ4467 |         | JSR R4,$POLSH    | )                                      |
|        | Ø13774 |         |                  | )                                      |
| Ø51152 | Ø64412 |         | $MLR             | ) (#SAMPLES) x                         |
| Ø51154 | Ø51156 |         | .WORD .+2        | ) $\Sigma$XY                           |

| | | | |
|---|---|---|---|
| 051156 | 016746 | MOV X1+2,(SP)- | ) PUT ΣX ON |
| | 002350 | | ) STACK |
| 051162 | 016746 | MOV X1,(SP)- | ) |
| | 002342 | | ) |
| 051166 | 016700 | MOV YC, R0 | ) |
| | 002352 | | ) |
| | | | ) CONVERT ΣY TO |
| 051172 | 016701 | MOV YC+2,R1 | ) FLOATING POINT |
| | | | ) AND PUT IT ON |
| | 002350 | | ) THE STACK. |
| 051176 | 004767 | JSR PC,DFLOAT | ) |
| | 000564 | | |
| 051202 | 004467 | JSR R4,$POLSH | ) |
| | | | ) |
| | 013740 | | ) GET (#SAMPLES) |
| | | | ) (ΣXY)-ΣXΣY |
| 051206 | 064412 | $MLR | ) |
| 051210 | 057446 | $SBR | ) |
| 051212 | 051214 | .WORD .+2 | ) |
| 051214 | 016746 | MOV N1+2,(SP)- | ) |
| | | | ) PUT # SAMPLES |
| | 002334 | | ) ON THE STACK. |
| 051220 | 016746 | MOV N1,(SP)- | ) |
| | 002326 | | |
| 051224 | 016746 | MOV X2+2,(SP)- | ) |
| | | | ) PUT ΣX² ON |
| | 002276 | | ) STACK. |
| 051230 | 016746 | MOV X2,(SP)- | ) |
| | 002270 | | |
| 051234 | 004467 | JSR R4,$POLSH | ) |
| | | | ) GET (#SAMPLES) |
| | 013706 | | ) (ΣX²) |
| 051240 | 064412 | $MLR | ) |
| 051242 | 051244 | .WORD .+2 | |
| 051244 | 016746 | MOV X1+2,(SP)- | ) |
| | | | ) |
| | 002262 | | ) PUT ΣX ON |
| | | | ) STACK. |
| 051250 | 016746 | MOV X1,(SP)- | ) |

```
         ØØ2254
Ø51254   Ø16746              MOV X1+2,(SP)- ;ΣX ON STACK AGAIN
         ØØ2252

Ø5126Ø   Ø16746              MOV X1,(SP)-
         ØØ2244

Ø51264   ØØ4467              JSR R4,$POLSH    )
         Ø13656                               )
Ø5127Ø   Ø64412              $MLR             )
         RQ@GE       Ø1Ø                      ) (#SAMPLES)(Σxy)-(Σx)(Σy)
                                              ) ─────────────────────
                                              ) (#SAMPLES)(Σx²)-(Σx)(Σx)
Ø51272   Ø57446              $SBR             )
                                              )       SLOPE
Ø51274   Ø635ØØ              $DVR             )
Ø51276   Ø64772              $NGR             )
Ø513ØØ   Ø513Ø2              .WORD .+2        )

Ø513Ø2   Ø16746              MOV SAMSØ1+2,(SP)-)
         ØØ2252                                 ) PUT # SAMPLES/
                                                ) SECOND ON
Ø513Ø6   Ø16746              MOV SAMSØ1,(SP)-   ) STACK
         ØØ2244

Ø51312   ØØ4467              JSR R4,$POLSH
         Ø1363Ø

Ø51316   Ø64412              $MLR

Ø5132Ø   Ø51322              .WORD .+2

Ø51322   ØØ5Ø46              CLR (SP)-

Ø51324   Ø12746              MOV #Ø4171Ø,(SP)-;FLOATING POINT
                                              1ØØ
         Ø4171Ø

Ø5133Ø   ØØ4467              JSR R4,$POLSH
         Ø13612

Ø51334   Ø635ØØ              $DVR ; VOLT  = SLOPExSAMPLE  x  1
                                   ────    ──────────────   ───
                                   SEC         SEC          1ØØ

Ø51336   Ø5134Ø              .WORD .+2

Ø5134Ø   Ø11667              MOV (SP),TEMP     )
         ØØ2216                                ) STORE V/S FOR
                                               ) LATER USE.
Ø51344   Ø16667              MOV 2(SP),TEMP+2  )
```

| | 000002 | | | |
|---|---|---|---|---|
| | 002212 | | | |
| 051352 | 016746 | | MOV PREV+2,(SP)- | ) |
| | 002212 | | | ) PUT PREVIOUS |
| | | | | ) V/S ON STACK |
| 051356 | 016746 | | MOV PREV,(SP)- | ) |
| | 002204 | | | |
| 051362 | 004467 | | JSR R4,$POLSH | ) |
| | 013560 | | | )PREV-CURRENT |
| | | | | )V/S. |
| 051366 | 057446 | | $SBR | ) |
| 051370 | 051372 | | .WORD .+2 | |
| 051372 | 032716 | | BIT #100000,(SP) | ) |
| | 100000 | | | ) |
| 051376 | 001404 | | BEQ OVR | ) GET THE |
| | | | | ) ABSOLUTE VALUE |
| 051400 | 004467 | | JSR R4, $POLSH | ) \|PREV V/S- |
| | 013542 | | | ) CURRENT V/S\| |
| | | | | ) |
| 051404 | 064772 | | $NGR | ) |
| 051406 | 051410 | | .WORD .+2 | |
| 051410 | 005767 | OVR: | TST ERRSW | ) |
| | 002156 | | | ) LARGE OR SMALL |
| | | | | ) ERROR BAND? |
| | | | | ) |
| 051414 | 001410 | | BEQ LARGE | ) |
| 051416 | 005367 | | DEC ERRSW-SMALL--DECREASE # SMALL | |
| | | | SAMPLES BEFORE | |
| | | | SWITCHING ERROR | |
| | | | BANDS. | |
| | 002150 | | | |
| 051422 | 001405 | | BEQ LARGE | |
| 051424 | 016746 | | MOV SE+2,(SP)- | ) |
| | 002150 | | | ) MOVE SMALL |
| | | | | ) ERROR BAND |
| | | | | ) ONTO STACK. |
| 051430 | 016746 | | MOV SE,(SP)- | ) |
| | 002142 | | | |
| 051434 | 000404 | | BR TSTE; TEST FOR ACRILOK | |
| | RQ@GE | 011 | | |

| | | | | |
|---|---|---|---|---|
| Ø51436 | Ø16746 | LARGE: | MOV LE+2,(SP)- | ) MOVE LARGE |
| | ØØ2142 | | | ) ERROR BAND |
| | | | | ) ONTO STACK. |
| Ø51442 | Ø16746 | | MOV LE,(SP)- | ) |
| | ØØ2134 | | | |
| Ø51446 | ØØ4467 | TSTE: | JSR R4,$POLSH | ) |
| | Ø13474 | | | ) COMPARE |
| | | | | ) PREV V/S- |
| Ø51452 | Ø6Ø2Ø6 | | $CMR | ) CURRENT V/S |
| | | | | ) TO ALLOWABLE |
| Ø51454 | Ø51456 | | .WORD .+2 | ) ERROR IN V/S |
| | | | | ) AND JMP IF TOO |
| Ø51456 | ØØ34Ø2 | | BLE .+6 | ) LARGE. |
| Ø5146Ø | ØØØ167 | | JMP ACRILOCK | ) |
| | ØØØ63Ø | | | |
| Ø51464 | Ø16767 | | MOV TEMP,PREV; | )THIS IS .+6 |
| | ØØ2Ø72 | | | ) |
| | | | | )YOU ARE WITHIN |
| | ØØ2Ø74 | | | ) THE ERROR BAND |
| | | | | )(STORE THE FEED |
| Ø51472 | Ø16767 | | MOV TEMP+2,PREV+2 | )RATE IN V/S |
| | ØØ2Ø66 | | | ) |
| | ØØ2Ø7Ø | | | |
| Ø515ØØ | ØØ5267 | | INC UPDAT;SET THE FLAG TO INDICATE A NEW FEED RATE HAS JUST BEEN CALCULATED | |
| | ØØ2ØØ2 | | | |
| Ø51504 | ØØ5767 | | TST LOS | ) ARE WE USING |
| | ØØ21Ø2 | | | ) LARGE OR SMALL |
| | | | | ) SAMPLES? |
| Ø5151Ø | ØØ1451 | | BEQ LAR | ) |
| Ø51512 | ØØ5367 | | DEC LOS;DECREMENT # OF SMALL SAMPLES. | |
| | ØØ2Ø74 | | | |
| Ø51516 | Ø16746 | UPDATE: | MOV K+2,(SP)- | ) |
| | ØØ2Ø76 | | | ) PUT OUTPUT |
| | | | | ) CONSTANT |
| | | | | ) (SYSTEM GAIN) |
| Ø51522 | Ø16746 | | MOV K,(SP)- | ) ON THE STACK. |
| | ØØ2Ø7Ø | | | |
| Ø51526 | Ø16746 | | MOV FR+2,(SP)- | ) |
| | ØØ2Ø72 | | | ) PUT DESIRED |
| | | | | ) FEED RATE ON |
| | | | | ) THE STACK. |
| Ø51532 | Ø16746 | | MOV FR,(SP)- | ) |

```
        002064
051536  016746            MOV PREV+2,(SP)-   )
                                             ) PUT CURRENT
        002026                                ) FEED RATE ON
                                             ) THE STACK.
051542  016746            MOV PREV,(SP)-     )
        002020

051546  004467            JSR R4,$POLSH      )
        013374                                )
051552  057446            $SBR               ) (CURRENT-DESIR-
                                             ) ED)K + CONWOR
051554  064412            $SMLR              ) PREVIOUS MOTOR
051556  065024            $RI                ) SPEED.
051560  051562            .WORD .+2          )
051562  062667            ADD (SP)+,CONWOR   )
        002040

051566  026727            CMP CONWOR,#2000   )
        002034                                )
        002000                                ) IF RESULT IS
                                             ) GREATER THAN
                                             ) 2000 (6V@
051574  100403            BMI CNTU            ) OUTPUT OF D/A)
                                             ) MAKE IT=2000;
051576  012767            MOV#1777,CONWOR    ) I.E., LIMIT
        001777                                ) RESULT TO 6 VOLTS
        002022                                )
        RQ@GE    012

051604  042767            CNTU:BIC#02,SET; GET SET TO UPDATE MOTOR
                                             SPEED.
        000002
        125736

051612  005167            COM CONWOR         )
                                             ) THE D/A USES
        002010                                ) NEGATIVE LOGIC
                                             )
051616  016767            MOV CONWOR, OUT    )
        002004
        125730

051624  005167            COM CONWOR; BUT THE PROGRAMMER
                                       PREFERS TO THINK
                                       POSITIVE.
```

|        |        |       |                     |                                |
|--------|--------|-------|---------------------|--------------------------------|
|        | 001776 |       |                     |                                |
| 051630 | 004767 |       | JSR PC,RESTORE;     | GO BACK TO WHERE               |
|        |        |       |                     | YOU WERE BEFORE                |
|        |        |       |                     | BEING RUDELY                   |
|        |        |       |                     | INTERRUPTED.                   |
|        | 000522 |       |                     |                                |
| 051634 | 016746 | LAR:  | MOV PREV+2,(SP)-    | )                              |
|        | 001730 |       |                     | )                              |
| 051640 | 016746 |       | MOV PREV,(SP)-      | ) IF YOU ARE                   |
|        | 001722 |       |                     | ) CALLING FOR                  |
|        |        |       |                     | ) LARGE SAMPLES,               |
|        |        |       |                     | ) I.E. AN AVERAGE              |
| 051644 | 016746 |       | MOV AVG+2, (SP)-    | ) OF THE V/S                   |
|        | 001762 |       |                     | ) CALCULATIONS,                |
|        |        |       |                     | ) THEN YOU ARE                 |
|        |        |       |                     | ) HERE. COMPUTE                |
| 051650 | 016746 |       | MOV AVG, (SP)-      | ) THE RUNNING                  |
|        | 001754 |       |                     | ) AVERAGE.                     |
| 051654 | 004467 |       | JSR R4,$POLSH       | )                              |
|        | 013266 |       |                     | )                              |
| 051660 | 057452 |       | $ADR                | )                              |
| 051662 | 051664 |       | .WORD .+2           | )                              |
| 051664 | 005767 |       | TST SSLST           | )                              |
|        | 001744 |       |                     | ) IF YOU HAVE                  |
| 051670 | 001411 |       | BEQ CALL            | ) ENOUGH V/S                   |
|        |        |       |                     | ) CALCULATIONS                 |
| 051672 | 005367 |       | DEC SSLST           | ) USE THE                      |
|        | 001736 |       |                     | ) AVERAGE; I.E.                |
|        |        |       |                     | ) JUMP TO CALL.                |
| 051676 | 001406 |       | BEQ CALL            | )                              |
| 051700 | 012667 |       | MOV (SP)+,AVG       | )                              |
|        | 001724 |       |                     | ) YOU DON'T HAVE               |
|        |        |       |                     | ) ENOUGH V/S                   |
| 051704 | 012667 |       | MOV (SP)+,AVG+2     | ) CALCULATIONS.                |
|        | 001722 |       |                     | ) RETURN TO WHERE              |
|        |        |       |                     | ) YOU WERE BEFORE              |
|        |        |       |                     | ) THE INTERRUPT.               |
| 051710 | 004767 |       | JSR PC,RESTORE      | )                              |
|        | 000442 |       |                     |                                |
| 051714 | 016767 | CALL: | MOV SSLSTI,SSLST    | )                              |
|        | 001716 |       |                     | )                              |

|         |        |        |                      |                            |
|---------|--------|--------|----------------------|----------------------------|
|         | 001712 |        |                      | ) RESET #SMALL             |
|         |        |        |                      | ) SAMPLES PER              |
| 051722  | 016746 |        | MOV SSLSTR+2,(SP)-   | ) LARGE SAMPLE             |
|         |        |        |                      | ) TIME.                    |
|         | 001714 |        |                      |                            |
| 051726  | 016746 |        | MOV SSLSTR,(SP)-     | ;PUT # SMALL               |
|         |        |        |                      | SAMPLES/LARGE SAM.         |
|         |        |        |                      | ON STACK.                  |
|         | 001706 |        |                      |                            |
| 051732  | 004467 |        | JSR R4,$POLSH        | )                          |
|         | 013210 |        |                      | ) GET THE AVER.            |
|         |        |        |                      | ) OF THE SMALL             |
| 051736  | 063500 |        | $DVR                 | ) SAMPLES COM-             |
|         |        |        |                      | ) PRISING THE              |
| 051740  | 051742 |        | .WORD .+2            | ) LARGE SAMPLE.            |
| 051742  | 012667 |        | MOV (SP)+,PREV       | )                          |
|         | 001620 |        |                      | ) STORE THE                |
|         |        |        |                      | ) AVERAGE.                 |
| 051746  | 012667 |        | MOV (SP)+,PREV+2     | )                          |
|         | 001616 |        |                      |                            |
|         | RQ@GE  | 013    |                      |                            |
| 051752  | 005067 |        | CLR AVG              | )                          |
|         | 001652 |        |                      | ) RESET THE AVG.           |
| 051756  | 005067 |        | CLR AVG+2            | )                          |
|         | 001650 |        |                      |                            |
| 051762  | 000167 |        | JMP UPDATE           | ;REFRESH THE M TOR         |
|         |        |        |                      | SPEED.                     |
|         | 177530 |        |                      |                            |
| 051766  | 012667 | DFLOAT:| MOV (SP)+,RTRN       | )                          |
|         | 000164 |        |                      | )                          |
| 051772  | 005046 |        | CLR (SP)-            | )                          |
| 051774  | 005046 |        | CLR -(SP)            | )                          |
| 051776  | 005700 |        | TST R0               | )                          |
| 052000  | 003007 |        | BGT POS27            | )                          |
| 052002  | 002403 |        | BLT OVE27            | )                          |
| 052004  | 005701 |        | TST R1               | )                          |
| 052006  | 001432 |        | BEQ ZER27            | )                          |

| | | | | |
|---|---|---|---|---|
| Ø52Ø1Ø | ØØØ4Ø3 | | BR POS27 | ) |
| Ø52Ø12 | ØØ54Ø1 | OVE27: | NEG R1 | ) |
| Ø52Ø14 | ØØ54ØØ | | NEG RØ | ) |
| Ø52Ø16 | ØØ56Ø1 | | SBC R1 | ) |
| Ø52Ø2Ø | ØØ6146 | POS27: | ROL -(SP) | ) |
| Ø52Ø22 | ØØØ241 | | CLC | ) |
| Ø52Ø24 | Ø127Ø2 | | MOV #24Ø,R2 | ) |
| | ØØØ24Ø | | | ) |
| Ø52Ø3Ø | ØØ61Ø1 | NOM27: | ROL R1 | ) |
| Ø52Ø32 | ØØ61ØØ | | ROL RØ | ) |
| Ø52Ø34 | 1Ø34Ø2 | | BCS NOD27 | ) DOUBLE |
| Ø52Ø36 | ØØ53Ø2 | | DEC R2 | ) PRECISION |
| Ø52Ø4Ø | ØØØ773 | | BR NOM27 | ) INTEGER TO |
| Ø52Ø42 | ØØØ3Ø1 | NOD27: | SWAB R1 | ) FLOATING POINT |
| Ø52Ø44 | 11Ø166 | | MOVB R1,4(SP) | ) SUBROUTINE |
| | ØØØØØ4 | | | ) |
| Ø52Ø5Ø | 11ØØ66 | | MOVB RØ,5(SP) | ) |
| | ØØØØØ5 | | | ) |
| Ø52Ø54 | 1Ø5ØØØ | | CLRB RØ | ) |
| Ø52Ø56 | 15Ø2ØØ | | BISB R2,RØ | ) |
| Ø52Ø6Ø | ØØØ3ØØ | | SWAB RØ | ) |
| Ø52Ø62 | ØØ6Ø26 | | ROR (SP)+ | ) |
| Ø52Ø64 | ØØ6ØØØ | | ROR RØ | ) |
| Ø52Ø66 | ØØ6Ø66 | | ROR 2(SP) | ) |
| | ØØØØØ2 | | | ) |
| Ø52Ø72 | Ø1ØØ16 | | MOV RØ,@SP | ) |
| Ø52Ø74 | ØØØ137 | ZER27: | JMP @(PC)+ | ) |
| Ø52Ø76 | ØØØØØØ | RTRN: | Ø | ) |
| Ø521ØØ | ØØ5ØØ2 | MULTY: | CLR R2 | ) INTEGER MULTIPLY |
| Ø521Ø2 | ØØ5ØØ4 | | CLR R4 | ) SUBROUTINE |
| Ø521Ø4 | Ø127Ø3 | | MOV #16.,R3 | ) 16BIT X 16BIT= |
| | ØØØØ2Ø | | | ) 32 BIT RESULT. |

| | | | |
|---|---|---|---|
| 052110 | 006200 | | ASR R0 |
| 052112 | 103001 | MR: | BCC .+4 |
| 052114 | 060102 | | ADD R1,R2 |
| | RQ@GE | 014 | |
| 052116 | 006002 | | ROR R2 |
| 052120 | 006000 | | ROR R0 |
| 052122 | 005303 | | DEC R3 |
| 052124 | 001372 | | BNE MR |
| 052126 | 010001 | | MOV R0,R1 |
| 052130 | 010200 | | MOV R2,R0 |
| 052132 | 000207 | | RTS PC |
| 052134 | 052767 | RESET: | BIS#2,SET |
| | 000002 | | |
| | 125406 | | |
| 052142 | 062767 | | ADD#17,OFFDAC |
| | 000017 | | |
| | 000136 | | |
| 052150 | 016767 | | MOV OFFDAC,OFFSET |
| | 000132 | | |
| | 125376 | | |
| 052156 | 012767 | | MOV#24150,LOOP1;90 MILLISEC |
| | 024150 | | |
| | 000124 | | |
| 052164 | 005367 | A: | DEC LOOP1 |
| | 000124 | | |
| 052170 | 001375 | | BNE A |
| 052172 | 062767 | RESETA: | ADD#1,OFFDAC |
| | 000001 | | |
| | 000106 | | |
| 052200 | 016767 | | MOV OFFDAC,OFFSET |
| | 000102 | | |
| | 125346 | | |

) INTEGER
) MULTIPLY
) SUBROUTINE
) 16BIT×16BIT=
) 32BIT RESULT.
) (CONT'D.)

) WHEN A/D OUTPUT
) RAMPS GREATER
) THAN 9V LIMIT
) RESET IT CLOSE
) TO ZERO BY
) CHANGING THE
) OFFSET VALUE &
) COMPARING,
) LOOPING. NOTE
) THE RESPONSE
) TIME OF 90
) MILLISEC FOR
) LARGE STEPS, &
) WHEN YOU GET
) CLOSE TO ZERO,
) RESPONSE TIME
) OF 5 MILLI-
) SECONDS.

| | | | |
|---|---|---|---|
| 052206 | 012767 | MOV#4440,LOPP1; 5MILLISEC | ) |
| | 004440 | | ) |
| | 000074 | | ) WHEN A/D OUT- |
| | | | ) PUT RAMPS |
| 052214 | 005367 | B:DEC LOOP1 | ) GREATER THAN 9V |
| | 000070 | | ) LIMIT RESET IT |
| 052220 | 001375 | BNE B | ) CLOSE TO ZERO |
| 052222 | 005267 | INC SET | ) BY CHANGING THE |
| | 125322 | | ) OFFSET VALUE & |
| 052226 | 105767 | WATHO:TSTB SET | ) COMPARING, |
| | 125316 | | ) LOOPING.NOTE THE |
| 052232 | 100375 | BPL WATHO | ) RESPONSE TIME |
| 052234 | 026727 | CMP DATA,#177631 | ) OF 90MILLISEC |
| | 125312 | | ) FOR LRG STEPS & |
| | 177631 | | ) WHEN YOU GET |
| 052242 | 100001 | BPL CONTIN | ) CLOSE TO ZERO, |
| 052244 | 000752 | BR RESETA | ) RESPONSE TIME |
| 052246 | 016767 | CONTIN:MOV N,X | ) OF 5 MILLISEC- |
| | 001276 | | ) ONDS. |
| | 001244 | | ) |
| 052254 | 016767 | MOV INTSA,INIS; RESET INTER-RUPTS/SAMPLE | |
| | 001232 | | |
| | 001226 | | |
| | ROCGE | 015 | |
| 052262 | 005067 | CLR Y | ) |
| | 001226 | | ) |
| 052266 | 005067 | CLR Y+2 | ) ZERO THE SUMS; |
| | 001224 | | ) THROW OUT THIS |
| 052272 | 005067 | CLR XY | ) SAMPLE PERIOD |
| | 001236 | | ) DUE TO THE |
| 052276 | 005067 | CLR XY+2 | ) NEED FOR RE- |
| | | | ) SETTING. |

```
                001234
052302   004767               JSR PC,RESTORE;RETURN TO PREVIOUS
                                                     TASK.
         000050
052306   000000    OFFDAC:0
052310   000000    LOOP1:0
052312   000000    HPREMP:HALT;IF HOPPER IS EMPTY HALT.
052314   005267    ACRILOCK:   INC ACRILK      )
                                               )
         001266                                )
052320   005267               INC UPDAT        ) SET ACRILOCK
         001162                                ) FLAG.
                                               )
052324   004767               JSR PC,RESTORE   )
         000026
052330   012667    SAVE:      MOV (SP)+, SAV   )
         000016                                )
                                               )
052334   010046               MOV R0,(SP)-     )
052336   010146               MOV R1,(SP)-     )
052340   010246               MOV R2,(SP)-     )SAVE SUBROUTINE
052342   010346               MOV R3,(SP)-     )
052344   010446               MOV R4,(SP)-     )
052346   010546               MOV R5,(SP)-     )
052350   000137               JMP @(PC)+       )
052352   000000    SAV:       0                )
052354   000000    SAV1:      0                )
052356   005726    RESTORE:     TST (SP)+      )
052360   012605               MOV (SP)+,R5     )
052362   012604               MOV (SP)+,R4     )
052364   012603               MOV (SP)+,R3     ) RESTORE
052366   012602               MOV (SP)+,R2     ) SUBROUTINE.
052370   012601               MOV (SP)+,R1     )
```

```
Ø52372   Ø12600          MOV (SP)+,RØ      ) RESTORE
                                           ) SUBROUTINE
Ø52374   ØØØØØ2          RTI               )

Ø52376   Ø16746   INIT:  MOV TABLE1+12,(SP)-;# SAMPLES
                                           ) YOU COME HERE
         17601Ø                             ) AFTER ANSWERING
                                           ) QUESTIONS TO
Ø524Ø2   Ø16746          MOV TABLE1+1Ø,(SP)-ESTABLISH A
                                             NEW SET OF
         176ØØ2                              OPERATING
                                             PARAMETERS.
Ø524Ø6   ØØ4467          JSR R4,$POLSH

Ø12534

Ø52412   Ø65Ø24          $RI

Ø52414   Ø52416          .WORD .+2

Ø52416   Ø12667          MOV (SP)+,HOLD; INTEGER # SAMPLES.

ØØ1226

Ø52422   Ø16746          MOV TABLE1+12,(SP)-)
                                            )
         175764                             )
                                            )
         RQ@GE    Ø16                       )
                                            )
Ø52426   Ø16746          MOV TABLE1+1Ø,(SP)-)
                                            )
         175756                             )
                                            )
Ø52432   Ø16746          MOV TABLE1+12,(SP)-)
                                            )
         175754                             )
                                            ) CALCULATE NEW
Ø52436   Ø16746          MOV TABLE1+1Ø,(SP)-)
                                            ) ΣX =
         175746                             )
                                            ) x(x+1)
Ø52442   ØØ5Ø46          CLR (SP)-          ) ───────
                                            )    2
Ø52444   Ø12746          MOV #ONEF,(SP)-    )

Ø4Ø2ØØ                             )
                                            )
Ø5245Ø   ØØ4467          JSR R4,$POLSH      )
                                            )
         Ø12472                             )

Ø52454   Ø57452          $ADR               )
                                            )
Ø52456   Ø64412          SHLR               )
                                            )
Ø5246Ø   Ø52462          .WORD .+2          )
                                            )
Ø52462   ØØ5Ø46          CLR (SP)-          )
```

| | | | |
|---|---|---|---|
| 052464 | 012746 | MOV #TWOF,(SP)- | )
| | 040400 | | )
| 052470 | 004467 | JSR R4, $POLSH | ) CALCULATE NEW
| | 012452 | | ) $\Sigma X =$
| 052474 | 063500 | $DVR | )
| 052476 | 052500 | .WORD .+2 | ) $\frac{x(x+1)}{2}$
| 052500 | 012667 | MOV (SP)+,HOLD1 | )
| | 001146 | | ) PUT IT IN
| 052504 | 012667 | MOV (SP)+,HOLD2 | ) STORAGE
| | 001144 | | )
| 052510 | 005046 | CLR (SP)- | )
| 052512 | 012746 | MOV #ONEF,(SP)- | )
| | 040200 | | )
| 052516 | 016746 | MOV TABLE1+12,(SP)- | )
| | 175670 | | )
| 052522 | 016746 | MOV TABLE1+10,(SP) | )
| | 175662 | | )
| 052526 | 005046 | CLR (SP)- | ) CALCULATE NEW
| 052530 | 012746 | MOV #TWOF,(SP)- | ) $\Sigma X^2 =$
| | 040400 | | )
| | | | ) $\frac{(2x+1)(x+1)(x)}{6}$
| 052534 | 004467 | JSR R4,$POLSH | )
| | 012406 | | )
| 052540 | 064412 | $MLR | )
| 052542 | 057452 | $ADR | )
| 052544 | 052546 | .WORD .+2 | )
| 052546 | 016746 | MOV TABLE1+12,(SP) | )
| | 175640 | | )
| 052552 | 016746 | MOV TABLE1+10,(SP)- | )
| | 175632 | | )
| 052556 | 016746 | MOV TABLE1+12,(SP)- | |
| | 175630 | | |

| | | | |
|---|---|---|---|
| ∅52562 | ∅16746 | MOV TABLE1+1∅,(SP)- | ) |
| | 175622 | | ) |
| ∅52566 | ∅∅5∅46 | CLR (SP)- | ) |
| ∅5257∅ | ∅12746 | MOV #ONEF,(SP)- | ) |
| | ∅4∅2∅∅ | | ) |
| | RQCGE | ∅17 | ) |
| ∅52574 | ∅∅4467 | JSR R4,$POLSH | ) |
| | ∅12346 | | ) |
| ∅526∅∅ | ∅57452 | $ADR | ) |
| ∅526∅2 | ∅64412 | $MLR | ) |
| ∅526∅4 | ∅64412 | $MLR | ) CALCULATE NEW |
| ∅526∅6 | ∅5261∅ | .WORD .+2 | ) $\sum x^2 =$ |
| ∅5261∅ | ∅65∅46 | CLR (SP)- | ) |
| ∅52612 | ∅12746 | MOV #SIXF,(SP)- | ) $\frac{(2x+1)(x+1)(x)}{6}$ |
| | ∅4∅7∅∅ | | ) |
| ∅52616 | ∅∅4467 | JSR R4,$POLSH | ) |
| | ∅12324 | | ) |
| ∅52622 | ∅635∅∅ | $DVR | ) |
| ∅52624 | ∅52626 | .WORD .+2 | ) |
| ∅52626 | ∅12667 | MOV (SP)+,HOLD3 | ) |
| | ∅∅1∅24 | | ) PUT IT IN |
| | | | ) STORAGE |
| ∅5263∅ | ∅12667 | MOV (SP)+,HOLD4 | ) |
| | ∅∅1∅22 | | ) |
| ∅52636 | ∅16746 | MOV TABLE1+42,(SP)- | ) |
| | 1756∅∅ | | ) |
| ∅52642 | ∅16746 | MOV TABLE1+44,(SP)- | ) CONVERT NEW |
| | 175572 | | ) # SMALL |
| | | | ) SAMPLES BE- |
| ∅52646 | ∅∅4467 | JSR R4,$POLSH | ) FORE SWITCH- |
| | ∅12274 | | ) ING ERROR |
| | | | ) BANDS & |
| | | | ) CONVERT TO |
| ∅52652 | ∅65∅24 | $RI | ) INTEGER |
| ∅52654 | ∅52656 | .WORD .+2 | ) |

```
Ø52656    Ø12667              MOV (SP)+,HOLD5;PUT IT IN
                                                 STORAGE
          ØØ1ØØØ

Ø52662    Ø16746              MOV TABLE1+22,(SP)-)
                                                  )
          175534                                  )
                                                  )
Ø52666    Ø16746              MOV TABLE1+2Ø,(SP)-) CONVERT NEW
                                                  ) #SMALL
          175526                                  ) SAMPLES PER
                                                  ) LARGE SAMPLE
Ø52672    ØØ4467              JSR R4,SPOLSH       ) & CONVERT TO
                                                  ) INTEGER.
          Ø1225Ø                                  )
                                                  )
Ø52676    Ø65Ø24              SRI                 )
                                                  )
Ø527ØØ    Ø527Ø2              .WORD .+2           )

Ø527Ø2    Ø12667              MOV (SP)+,HOLD6; PUT IT IN
                                                 STORAGE
          ØØØ756

Ø527Ø6    Ø16746              MOV TABLE1+32,(SP)-)
                                                  )
          17552Ø                                  )
                                                  )
Ø52712    Ø16746              MOV TABLE1+3Ø,(SP)-)
                                                  )CONVERT NEW #
          175512                                  )SMALL SAMPLES
                                                  )BEFORE SWITCH-
Ø52716    ØØ4467              JSR R4,SPOLSH       )ING TO LARGE
                                                  ) SAMPLES &
          Ø12224                                  )CONVERT TO
                                                  )INTEGER.
Ø52722    Ø65Ø24              SRI                 )
                                                  )
Ø52724    Ø52726              .WORD .+2           )

Ø52726    Ø12667              MOV (SP)+,HOLD7;PUT IT IN
                                                 STORAGE
          ØØØ734

Ø52732    ØØ5Ø67              CLR LKS;TURN OFF THE REAL TIME
                                                 CLOCK
          124612

Ø52736    ØØ5Ø67              CLR XY              )
                                                  )
          ØØØ572                                  )
                                                  )
          RQCGE    Ø2Ø                            )
                                                  ) ZERO THE
                                                  ) SUMS.
Ø52742    ØØ5Ø67              CLR XY+2            )
                                                  )
          ØØØ57Ø                                  )
```

| | | | |
|---|---|---|---|
| Ø52746 | ØØ5Ø67 | CLR Y | ) |
| | ØØØ542 | | ) ZERO THE SUMS. |
| | | | ) |
| Ø52752 | ØØ5Ø67 | CLR Y+2 | ) |
| | ØØØ54Ø | | ) |
| Ø52756 | Ø16767 | MOV HOLD8,SAMSØ1 | ) |
| | ØØØ7Ø6 | | ) |
| | ØØØ572 | | ) |
| Ø52764 | Ø16767 | MOV HOLD9,SAMSØ1+2 | ) |
| | ØØØ7Ø2 | | ) |
| | ØØØ566 | | ) |
| Ø52772 | Ø16767 | MOV HOLD7,LOS | ) |
| | ØØØ67Ø | | ) |
| | ØØØ612 | | ) |
| Ø53ØØØ | Ø16767 | MOV HOLD6,SSLST | ) |
| | ØØØ66Ø | | ) |
| | ØØØ626 | | ) |
| Ø53ØØ6 | Ø16767 | MOV HOLD5,ERRSW | ) |
| | ØØØ65Ø | | ) |
| | ØØØ556 | | ) |
| Ø53Ø14 | Ø16767 | MOV HOLD4,X2+2 | ) MOVE THE NEW |
| | ØØØ64Ø | | ) PARAMETERS INTO |
| | ØØØ5Ø4 | | ) REAL TIME |
| | | | ) VARIABLES |
| | | | ) DURING THE TIME |
| Ø53Ø22 | Ø16767 | MOV HOLD3,X2 | ) WHEN THE CLOCK |
| | ØØØ63Ø | | ) IS OFF SO THAT |
| | ØØØ474 | | ) THE TRANSITION |
| | | | ) DOES NOT OCCUR |
| | | | ) IN THE MIDDLE |
| | | | ) OF A SAMPLE |
| Ø53Ø3Ø | Ø16767 | MOV HOLD2,X1+2 | ) PERIOD. |
| | ØØØ62Ø | | ) |
| | ØØØ474 | | ) |
| Ø53Ø36 | Ø16767 | MOV HOLD1,X1 | ) |
| | ØØØ61Ø | | ) |
| | ØØØ464 | | ) |

| | | | |
|---|---|---|---|
| 052746 | 005067 | CLR Y | ) |
| | 000542 | | ) ZERO THE SUMS. |
| | | | ) |
| 052752 | 005067 | CLR Y+2 | ) |
| | 000540 | | ) |
| 052756 | 016767 | MOV HOLD8,SAMSØ1 | ) |
| | 000706 | | ) |
| | 000572 | | ) |
| 052764 | 016767 | MOV HOLD9,SAMSØ1+2 | ) |
| | 000702 | | ) |
| | 000566 | | ) |
| 052772 | 016767 | MOV HOLD7,LOS | ) |
| | 000670 | | ) |
| | 000612 | | ) |
| 053000 | 016767 | MOV HOLD6,SSLST | ) |
| | 000660 | | ) |
| | 000626 | | ) |
| 053006 | 016767 | MOV HOLD5,ERRSW | ) |
| | 000650 | | ) |
| | 000556 | | ) |
| 053014 | 016767 | MOV HOLD4,X2+2 | ) MOVE THE NEW |
| | 000640 | | ) PARAMETERS INTO |
| | 000504 | | ) REAL TIME |
| | | | ) VARIABLES |
| | | | ) DURING THE TIME |
| 053022 | 016767 | MOV HOLD3,X2 | ) WHEN THE CLOCK |
| | 000630 | | ) IS OFF SO THAT |
| | 000474 | | ) THE TRANSITION |
| | | | ) DOES NOT OCCUR |
| | | | ) IN THE MIDDLE |
| | | | ) OF A SAMPLE |
| 053030 | 016767 | MOV HOLD2,X1+2 | ) PERIOD. |
| | 000620 | | ) |
| | 000474 | | ) |
| 053036 | 016767 | MOV HOLD1,X1 | ) |
| | 000610 | | ) |
| | 000464 | | ) |

```
Ø53Ø44   Ø16767           MOV HOLD,N         )
         ØØØ6ØØ                              )
         ØØØ476                              )
Ø53Ø52   Ø16767           MOV SSLST,SSLSTI   )
         ØØØ556                              )
         ØØØ556                              )
Ø53Ø6Ø   Ø16767           MOV N,X            )
         ØØØ464                              )
         ØØØ432                              )
Ø53Ø66   Ø16767           MOV TABLE1,FR      )
         175306                              )
         ØØØ526                              ) MOVE THE NEW
Ø53Ø74   Ø16767           MOV TABLE1+2,FR+2) PARAMETERS INTO
         175302                              )
         ØØØ522                              ) REAL TIME
                                             ) VARIABLES
Ø531Ø2   Ø16767           MOV TABLE1+1Ø,N1 ) DURING THE
         175302                              )
         ØØØ442                              ) TIME WHEN THE
                                             ) CLOCK IS OFF
         RQ©GE    Ø21                        ) SO THAT THE
Ø5311Ø   Ø16767           MOV TABLE1+12,N+2) TRANSITION
         175276                              )
         ØØØ436                              ) DOES NOT OCCUR
                                             ) IN THE MIDDLE
Ø53116   Ø16767           MOV TABLE1+14,SE ) OF A SAMPLE
         175272                              )
         ØØØ452                              ) PERIOD.
Ø53124   Ø16767           MOV TABLE1+16,SE+2)
         175266                              )
         ØØØ446                              )
Ø53132   Ø16767           MOV TABLE1+34,LE   )
         175276                              )
         ØØØ442                              )
Ø5314Ø   Ø16767           MOV TABLE1+36,LE+2)
```

|         |        |                      |                      |
|---------|--------|----------------------|----------------------|
|         | 175272 |                      | )                    |
|         | 000436 |                      | ) MOVE THE           |
| 053146  | 016767 | MOV TABLE1+24,K      | ) NEW PARA-          |
|         | 175252 |                      | ) METERS INTO        |
|         | 000442 |                      | ) REAL TIME          |
| 053154  | 016767 | MOV TABLE1+26,K+2    | ) VARIABLES          |
|         | 175246 |                      | ) DURING THE         |
|         | 000436 |                      | ) TIME WHEN THE      |
| 053162  | 016767 | MOV INTSAM,INTSA     | ) CLOCK IS OFF       |
|         | 000506 |                      | ) SO THAT THE        |
|         | 000322 |                      | ) TRANSITION         |
| 053170  | 016767 | MOV INTSA,INTS       | ) DOES NOT OCCUR     |
|         | 000316 |                      | ) IN THE             |
|         | 000312 |                      | ) MIDDLE OF A        |
| 053176  | 016767 | MOV TABLE1+20,SLSTR  | ) SAMPLE             |
|         | 175216 |                      | ) PERIOD.            |
|         | 000434 |                      | )                    |
| 053204  | 016767 | MOV TABLE1+22,SLSTR+2 | )                   |
|         | 175212 |                      |                      |
|         | 000430 |                      |                      |
| 053212  | 005067 | CLR AVG              | )                    |
|         | 000412 |                      | ) ZERO AVG.          |
| 053216  | 005067 | CLR AVG+2            | )                    |
|         | 000410 |                      |                      |
| 053222  | 016706 | MOV STKST,SP         | )                    |
|         | 040420 |                      | ) RESET THE          |
|         |        |                      | ) STACK              |
| 053226  | 005746 | TST (SP)-            | )                    |
| 053230  | 052767 | BIS #40,LKS;TURN ON THE REAL TIME CLOCK. |   |
|         | 000040 |                      |                      |
|         | 124312 |                      |                      |

| | | | | |
|---|---|---|---|---|
| Ø53236 | ØØ5767 | TEST: | TST UPDAT;HAS A NEW FEEDRATE BEEN CALCULATED? | |
| | ØØØ244 | | | |
| Ø53242 | ØØ1ØØ3 | | BNE NEWDAT;YES PRINT IT | |
| Ø53244 | ØØØØØ1 | | WAIT;NO-WAIT FOR INTERRUPT. | |
| Ø53246 | ØØØ167 | | JMP TEST;RETURN HERE FROM INTERRUPT. | |
| | 177764 | | | |
| Ø53252 | ØØ5267 | NEWDAT: | INC CR | ) |
| | ØØØ16Ø | | | ) |
| | RQ@GE | Ø22 | | ) |
| Ø53256 | ØØ5767 | | TST ACRILK | ) |
| | ØØØ324 | | | ) |
| Ø53262 | ØØ14Ø7 | | BEQ AB | ) |
| Ø53264 | Ø16767 | | MOV TEMP,TEM | ) |
| | ØØØ272 | | | ) |
| | ØØØ21Ø | | | ) |
| Ø53272 | Ø16767 | | MOV TEMP+2,TEM+2 | ) |
| | ØØØ266 | | | ) PRINT OUT |
| | ØØØ2Ø4 | | | ) NEW FEED |
| Ø533ØØ | ØØØ4Ø6 | | BR ABC | ) RATE ON TTY; |
| Ø533Ø2 | Ø16767 | AB: | MOV PREV,TEM | ) 5 PRINTOUTS |
| | ØØØ26Ø | | | ) PER LINE, |
| | ØØØ172 | | | ) WITH * IF IN |
| Ø5331Ø | Ø16767 | | MOV PREV+2,TEM+2 | ) ACRILOK |
| | ØØØ254 | | | ) |
| | ØØØ166 | | | ) |
| Ø53316 | ØØ5Ø67 | ABC: | CLR UPDAT | ) |
| | ØØØ164 | | | ) |
| Ø53322 | Ø12746 | | MOV #BUFF,(SP)- | ) |
| | Ø53456 | | | ) |
| Ø53326 | Ø12746 | | MOV #14.,(SP)- | ) |

|        |        |       |                |
|--------|--------|-------|----------------|
|        | 000016 |       |                |
| 053332 | 012746 |       | MOV #5,(SP)-   |
|        | 000005 |       |                |
| 053336 | 005046 |       | CLR (SP)-      |
| 053340 | 016746 |       | MOV TEM+2,(SP)- |
|        | 000140 |       |                |
| 053344 | 016746 |       | MOV TEM,(SP)-  |
|        | 000132 |       |                |
| 053350 | 004767 |       | JSR PC,$GCO    |
|        | 006310 |       |                |
| 053354 | 005767 |       | TST ACRILK     |
|        | 000226 |       |                |
| 053360 | 001405 |       | BEQ AC         |
| 053362 | 012767 |       | MOV #'',BUFF   |
|        | 000052 |       |                |
|        | 000066 |       |                |
| 053370 | 005067 |       | CLR ACRILK     |
|        | 000212 |       |                |
| 053374 | 022767 | AC:   | CMP #5,CR      |
|        | 000005 |       |                |
|        | 000034 |       |                |
| 053402 | 001005 |       | BNE OUT!       |
| 053404 | 005067 |       | CLR CR         |
|        | 000026 |       |                |
| 053410 | 000004 |       | IOT            |
| 053412 | 053440 |       | .WORD CRLF     |
| 053414 | 012    |       | .BYTE WRITE,1  |
| 053415 | 001    |       |                |
| 053416 | 000004 | OUT!: | IOT            |
|        | RO@GE  | 023   |                |
| 053420 | 053450 |       | .WORD BBUFF    |

PRINT OUT
NEW FEED
RATE ON TTY;
5 PRINTOUTS
PER LINE, WITH
· IF IN
ACRILOK.

| | | | | |
|---|---|---|---|---|
| 053422 | 012 | | .BYTE WRITE,1 | ) |
| 053423 | 001 | | | )PRINT OUT |
| 053424 | 000004 | WAIT: | IOT | )NEW FEED |
| 053426 | 053424 | | .WORD WAIT | )RATE ON TTY; |
| 053430 | 004 | | .BYTE WAITR,1 | )5 PRINTOUTS |
| 053431 | 001 | | | )PER LINE, WITH |
| 053432 | 000167 | | JMP TEST | ) * IF IN |
| | 177600 | | | )ACRILOK. |
| 053436 | 000000 | CR:0 | | ) |
| 053440 | 000002 | CRLF: | 2 | ) |
| 053442 | 000000 | | 0 | ) |
| 053444 | 000002 | | 2 | ) |
| 053446 | 015 | | .BYTE 15,12 | ) |
| 053447 | 012 | | | ) |
| 053450 | 000016 | BBUFF: | 14. | ) |
| 053452 | 000000 | | 0 | ) |
| 053454 | 000016 | | 14. | ) |
| | 053502 | BUFF: | .=.+20. | ) |
| | 053506 | TEM: | .=.+4 | ) |
| 053506 | 000000 | UPDAT: | 0 | ) |
| 053510 | 000000 | | INTS: 0 | ) LOCATIONS |
| 053512 | 000000 | INTSA: | 0 | ) FOR VARIABLES |
| 053514 | 000000 | Y: | 0,0 | ) FLAGS, & |
| 053516 | 000000 | | | ) BUFFERS |
| 053520 | 000000 | X: | 0,0 | ) |
| 053522 | 000000 | | | ) |
| 053524 | 000000 | X2: | 0,0 | ) |
| 053526 | 000000 | | | ) |
| 053530 | 000000 | X1: | 0,0 | ) |
| 053532 | 000000 | | | ) |
| 053534 | 000000 | XY: | 0,0 | ) |

```
053536   000000
053540   000000    XYC:      0,0
053542   000000
053544   000000    YC:       0,0
053546   000000
053550   000000    N:        0
053552   000000    N1:       0,0
053554   000000
053556   000000    SAMS01:   0,0
053560   000000
053562   000000    TEMP:     0,0
053564   000000
053566   000000    PREV:     0,0
053570   000000
053572   000000    ERRSW:    0,0
053574   000000
053576   000000    SE:       0,0
053600   000000
         RQ@GE     024
053602   000000    LE:       0,0
053604   000000
053606   000000    ACRILK:   0,0
053610   000000
053612   000000    LOS:      0,0
053614   000000
053616   000000    K:        0,0
053620   000000
053622   000000    FR:       0,0
053624   000000
053626   000000    CONWOR:   0
053630   000000    AVG:      0,0
```

) 
) 
) 
) 
) 
) 
) 
) 
) 
) 
) 
) 
) LOCATIONS
) 
) FOR
) 
) VARIABLES,
) 
) FLAGS,
) 
) AND
) 
) BUFFERS
) 
) 
) 
) 
) 
) 
) 
) 
) 
) 
) 
) 
) 
) 
) 
) 
) 
) 
)

| | | | | |
|---|---|---|---|---|
| Ø53632 | ØØØØØØ | | | )
| Ø53634 | ØØØØØØ | SSLST: | Ø | )
| Ø53636 | ØØØØØØ | SSLST1: | Ø | )
| Ø53640 | ØØØØØØ | SSLSTR: | Ø,Ø | )
| Ø53642 | ØØØØØØ | | | )
| Ø53644 | ØØØØØØ | LOOP: | Ø | )
| Ø53646 | ØØØØØØ | STKST: | Ø | )
| Ø53650 | ØØØØØØ | HOLD: | | ) LOCATIONS
| Ø53652 | ØØØØØØ | HOLD1: | Ø | ) FOR
| Ø53654 | ØØØØØØ | HOLD2: | Ø | ) VARIABLES,
| Ø53656 | ØØØØØØ | HOLD3: | Ø | ) FLAGS,
| Ø53660 | ØØØØØØ | HOLD4: | Ø | ) AND
| Ø53662 | ØØØØØØ | HOLD5: | Ø | ) BUFFERS
| Ø53664 | ØØØØØØ | HOLD6: | Ø | )
| Ø53666 | ØØØØØØ | HOLD7: | Ø | )
| Ø53670 | ØØØØØØ | HOLD8: | Ø | )
| Ø53672 | ØØØØØØ | HOLD9: | Ø | )
| Ø53674 | ØØØØØØ | INTSAM: | Ø | )
| | ØØØØØ1 | .END | | )
| | RQ@GE | Ø25 | | )

SYMBOL TABLE LISTING

| | | | | | | | |
|---|---|---|---|---|---|---|---|
| A | 052164 | AB | 053302 | ABC | 053316 | AC | 053374 |
| ACRILK | 053606 | ACRILO | 052314 | ASK | 050060 | AVG | 053630 |
| B | 052214 | BBUFF | 053450 | BUFF | 053456 | BUFFER | 050250 |
| CALC | 051044 | CALL | 051714 | CK | 050746 | CNTU | 051604 |
| CONTIN | 052246 | CONWOR | 053626 | CR | 053436 | CRLF | 053440 |
| DATA | = 177552 | DFLOAT | 051766 | ERRSW | 053572 | FR | 053622 |
| HOLD | 053650 | HOLD1 | 053652 | HOLD2 | 053654 | HOLD3 | 053656 |
| HOLD4 | 053660 | HOLD5 | 053662 | HOLD6 | 053664 | HOLD7 | 053666 |
| HOLD8 | 053670 | HOLD9 | 053672 | HPREMP | 052312 | INIT | 052376 |
| INT | 050722 | INTS | 053510 | INTSA | 053512 | INTSAM | 053674 |
| K | 053616 | LAR | 051634 | LARGE | 051436 | LE | 053602 |
| LINK | 050716 | LKS | = 177550 | LOOP | 053644 | LOOP1 | 052310 |
| LOS | 053612 | MORE | 050076 | MR | 052112 | MTABLE | 050356 |
| MULTY | 052100 | N | 053550 | NEWDAT | 053252 | NOD27 | 052042 |
| NOM27 | 052030 | N1 | 053552 | OFFDAC | 052306 | OFFSET | = 177554 |
| ONEF | = 040200 | OUT | 177554 | OUT1 | 053416 | OVER27 | 052012 |
| OVR | 051410 | PC | =%000007 | POS27 | 052020 | PREV | 053566 |
| READ | = 000011 | RESET | 052134 | RESETA | 052172 | RESTOR | 052356 |
| RTRN | 052076 | R0 | =%000000 | R1 | =%000001 | R2 | =%000002 |
| R3 | =%000003 | R4 | =%000004 | R5 | =%000005 | R6 | =%000006 |
| SAMPLE | 050736 | SAMS01 | 053556 | SAV | 052352 | SAVE | 052330 |
| SAV1 | 052354 | SE | 053576 | SET | = 177550 | SIXF | = 040700 |
| SP | =%000006 | SSLST | 053634 | SSLSTR | 053640 | SSLST1 | 053636 |
| START | 050000 | STKST | 053646 | TABLE | 050450 | TABLEZ | 050714 |
| TABLE1 | 050400 | TABLE2 | 050472 | TABLE3 | 050506 | TABLE4 | 050522 |
| TABLE5 | 050544 | TABLE6 | 050570 | TABLE7 | 050604 | TABLE8 | 050630 |
| TABLE9 | 050662 | TEM | 053502 | TEMP | 053562 | TEST | 053236 |
| TSTE | 051446 | TWOF | = 040400 | UPDAT | 053506 | UPDATE | 051516 |
| WAIT | 053424 | WAITR | = 000004 | WAITT | 050116 | WATHO | 052226 |
| WBUFFE | 050104 | WRITE | = 000012 | X | 053520 | XY | 053534 |
| XYC | 053540 | X1 | 053530 | X2 | 053524 | Y | 053514 |
| YC | 053544 | ZER27 | 052074 | $ADR | = 057452 | $CER | = 060206 |
| $DVR | = 063500 | $GCO | = 061664 | $IR | = 064146 | $ML1 | = 064232 |
| $MLR | = 064412 | $NGR | = 064772 | $POL.SN | = 065146 | $RCI | = 064264 |
| $RI | = 065024 | $SBR | = 057446 | . | = 053676 | | |

000000 ERRORS

°S

From the foregoing disclosure, it can be seen that the instant invention provides an improved weigh feeding apparatus, wherein the discharge rate of a substance from a container may be maintained at a preselected constant value, wherein the container may be automatically refilled during the continuous discharge of the substance, wherein excessive excursions of the system are eliminated, wherein extraneous data recordings are eliminated when calculating the flow rate, and wherein past flow rate values may be stored in memory and compensated for at a later point in time.

Although a certain particular embodiment of the invention has been herein disclosed for purposes of explanation, various modifications thereof, after study of the specification, will be apparent to those skilled in the art to which the invention pertains.

What is claimed and desired to be secured by Letters Patent is:

1. A weigh feeding machine comprising:
   a container for a substance;
   means for discharging substance from the container at a controllable feed-out rate;
   means for sensing the weight of at least the container and any substance therein and for producing a first electrical signal indicative of the instantaneous value of said weight;
   a digital microprocessor and a digital memory;
   means for supplying to said digital microprocessor and memory said first electrical signal and a second electrical signal indicative of a desired feed-out rate;
   means for causing said digital microprocessor and memory to combine said first and second electrical signals and to produce as a result a third electrical signal indicative of the degree of a departure, if any, from the desired feed-out rate;
   means for causing the discharging means to feed out said substance at a feed-out rate determined by said third electrical signal;
   means for detecting forces which act on said weight sensing means and are in addition to the forces acting thereon which are due to the weight of said container and substance, and for producing a fourth electrical signal indicative of said additional forces; and
   means for supplying said fourth electrical signal to the digital microprocessor and memory and for causing the digital microprocessor and memory to compensate said third electrical signal for the additional forces of which said fourth electrical signal is indicative and to thereby tend to make the feed-out rate insensitive to said additional forces.

2. A weigh feeding machine as in claim 1 which includes means for monitoring the first electrical signal and for producing a fifth electrical signal when a selected characteristic of the first electrical signal is outside a defined range, and means for causing the digital microprocessor and memory to respond to said fifth electrical signal by inhibiting the operation of the third electrical signal, to thereby maintain the feed-out rate at the level thereof existing immediately before said fifth electrical signal.

3. A weigh feeding machine as in claim 2 including means for supplying said digital microprocessor and memory with a sixth electrical signal indicative of a desired minimum feed-out rate, means for causing the digital microprocessor and memory to produce an under-feed alarm signal when the feed-out rate indicated by changes in said first electrical signal falls below the minimum feed-out rate indicated by said sixth signal and means for displaying said under-feed alarm signal.

4. A weigh feeding machine as in claim 2 including means for supplying to said digital microprocessor and memory a seventh electrical signal indicative of a maximum desired feed-out rate, means for causing the digital microprocessor and memory to produce an over-feed alarm signal when the actual feed-out rate indicated by changes in said first electrical signal exceeds the over-feed rate indicated by said seventh signal and means for displaying said over-feed alarm signal.

5. A weigh feeding machine as in claim 2 which includes means for producing a refill electrical signal when the weight sensed by the sensing means falls below a selected minimum weight, means for causing an automatic refill of the container with substance to a desired weight level in response to said refill signal and means for causing the digital microprocessor and memory to inhibit the operation of said third electrical signal, to thereby maintain the feed-out rate at the level existing immediately prior to the refill signal, at least for the duration of said automatic refill.

6. A weigh feeding machine as in claim 5 which includes means for producing an over-weight electrical signal when the weight sensed by the sensing means represents a feed-out rate which exceeds a selected maximum feed-out rate, and means for causing the digital microprocessor and memory to respond to said over-weight signal by inhibiting the operation of the third electrical signal, to thereby maintain the feed-out rate at the level thereof existing immediately before the over-weight signal.

7. A weigh feeding machine comprising:
   a container for a substance;
   means for discharging substance from the container at a controllable feed-out rate;
   means for sensing the weight of at least the container and any substance therein for a predetermined period of time and for producing a succession of first electrical signals during successive instants within said predetermined period, each of said signals being indicative of an instantaneous value of said weight;
   a digital microprocessor and a digital memory;
   means for supplying to said digital microprocessor and memory said first electrical signals and for storing said signals in said memory;
   means for supplying to said digital microprocessor and memory a second electrical signal indicative of a desired feed-out rate;
   means for computing a predetermined deviation from the mean value of said stored first signals and for determining how many of said first signals differ in value from said mean value by more than said predetermined deviation;
   means for sensing whether the number of said deviating first signals exceeds a predetermined number;
   means, operative if said number of deviating first signals does not exceed said predetermined number, for causing said digital microprocessor and memory to combine the second electrical signal and the first electrical signals that do not differ in value by more than said predetermined deviation, and to produce as a result a third electrical signal indicative of the degree of departure, if any, of the current feed-out rate from the desired feed-out rate; and means for causing the discharging means to feed out said substance at a feed-out rate determined by said third electrical signal.

8. A weigh feeding machine as in claim 7 further including means, operative if said number of deviating first signals does exceed said predetermined number, for producing a further electrical signal, and means including the digital microprocessor and memory, responsive to said further signal, for inhibiting the third signal to maintain the feed-out rate at the level thereof existing immediately before said further signal.

9. A weigh feeding machine comprising:

a container for a substance;

means for discharging substance from the container at a controllable feed-out rate;

means for sensing the weight of at least the container and any substance therein for a predetermined period of time and for producing a succession of first electrical signals during successive instants within said predetermined period, each of said signals being indicative of an instantaneous value of said weight;

a digital microprocessor and a digital memory;

means for supplying to said digital microprocessor and memory said first electrical signals and for storing said signals in said memory;

means for supplying to said digital microprocessor and memory a second electrical signal indicative of a desired feed-out rate;

means for computing a predetermined deviation from the mean value of said stored first signals and determining how many of said first signals differ in value from said mean value by more than said predetermined deviation;

means for sensing whether the number of said deviating first signal exceeds a predetermined number;

means, operative if said number of deviating first signals exceeds said predetermined number, for producing a further electrical signal, and means including the digital microprocessor and memory, responsive to said further signal, for supplying a control signal to said discharging means for maintaining the feed-out rate of the substance constant at its then existing rate so long as said further signal is present.

10. A weigh feeding machine comprising:

a container for a substance which is to be discharged from the container at a controllable discharge rate;

means for sensing the weight of at least the container and any substance therein for a predetermined period of time and for producing a succession of first electrical signals during successive instants within said predetermined period, each of said signals being indicative of an instantaneous value of said weight;

a digital microprocessor and a digital memory;

means for supplying to said digital microprocessor and memory said first electrical signals and for storing said signals in said memory;

means for supplying to said digital microprocessor and memory a second electrical signal indicative of a desired discharge rate;

means for computing from said stored first signals further signals representative of upper and lower deviation levels from the mean value of said first signals and determining how many of said first signals fall outside said deviation levels during said predetermined period;

means for sensing whether the number of said deviating first signals exceeds a predetermined number; and means, responsive to said number of deviating first signals being less than said predetermined number, for causing said digital microprocessor and memory to combine the second electrical signal and the first electrical signals that fall within said deviation levels, and to produce as a result a third electrical signal indicative of the degree of departure, if any, of the current feed-out rate from the desired feed-out rate.

11. A weigh feeding machine comprising:

a container for a substance;

means for discharging substance from the container at a controllable feed-out rate;

means for sensing the weight of at least the container and any substance therein for a predetermined period of time and for producing a succession of first electrical signals during successive instants within said predetermined period, each of said signals being indicative of an instantaneous value of said weight;

a digital microprocessor and a digital memory;

means for supplying to said digital microprocessor and memory said first electrical signals and for storing said signals in said memory;

means for supplying to said digital microprocessor and memory a second electrical signal indicative of a desired feed-out rate;

means for computing a predetermined permissible deviation from the mean value of said stored first signals and determining whether said first signals differ in value from said mean value by more than said predetermined deviation;

means for causing said digital microprocessor and memory to combine the second electrical signal and the first electrical signals that do not differ in value by more than said predetermined deviation, and to produce as a result a third electrical signal indicative of the degree of departure, if any, of the current feed-out rate from the desired feed-out rate; and means for causing the discharging means to feed out said substance at a feed-out rate determined by said third electrical signal.

12. A weigh feeding machine comprising:

a container for a substance;

means for discharging substance from the container at a controllable feed-out rate;

means for sensing the weight of at least the container and any substance therein and for producing a succession of first electrical signals during successive instants within a predetermined period of time, each of said signals being indicative of an instantaneous value of said weight during said period;

a digital microprocessor and a digital memory;

means for supplying to said digital microprocessor and memory said first electrical signals and for storing said signals in said memory;

means for supplying to said digital microprocessor and memory a further electrical signal indicative of a desired feed-out rate;

means for causing said digital microprocessor and memory to combine said further electrical signal and at least certain of the first electrical signals and to produce as a result a control electrical signal indicative of the degree of departure, if any, of the current feed-out rate from the desired feed-out rate;

said sensing means also for sensing said weight and producing a succession of second electrical signals during successive instants within a second predetermined period of time, each of said second signals being indicative of an instantaneous value of said weight during said second period;

means for combining a first voltage with each of said second signals to obtain a succession of difference signals, each representing the difference in value between one of said second signals and said voltage;

means for storing said difference signals in memory and for causing said digital microprocessor and memory to combine said further electrical signal and at least certain of said difference signals, and to produce as a result a control electrical signal indicative of the degree of departure, if any, of the current feed-out rate during said second period from the desired feed-out rate;

said sensing means also for sensing said weight for successive additional periods of time, one after another, and for producing, during each such period, a succession of electrical signals representative of the instantaneous weight at successive instants during the period;

means for combining the signals produced during each such period with a voltage, said voltage being different in value for each such period, to obtain a succession of difference signals; and means for storing all of said difference signals in memory and for causing said digital microprocessor and memory to combine said further electrical signal and at least certain of said difference signals for each of said periods of time and to produce as a result a series of control electrical signals, one for each said period of time, indicative of the degree of departure, if any, of the current feed-out rate from the desired feed-out rate.

13. A weigh feeding machine comprising:

a container for a substance;

means for discharging substance from the container at a controllable feed-out rate;

means for sensing the weight of at least the container and any substance therein for a succession of predetermined periods of time and for producing a succession of first electrical signals during successive instants of each of said predetermined periods, each of said first signals being indicative of an instantaneous value of said weight;

means including a digital microprocessor and a digital memory for combining the signals sensed during each such period of time with a voltage level, said voltage level being different during each such period of time to obtain a succession of difference signals, each representative of the difference in weight between one of said voltage levels and a signal representative of the instantaneous weight sensed at an instant of time, and for storing said difference signals in said memory;

means for supplying to said digital microprocessor and memory a second electrical signal indicative of a desired feed-out rate; and means for causing said digital microprocessor and memory to combine the second electrical signal and at least selected ones of said difference signals during each of said periods of time, and to produce as a result control electrical signals indicative of the degree of departure, if any, of the current feed-out rate at successive instances from the desired feed-out rate.

* * * * *

Disclaimer

4,210,963.—*Ronald J. Ricciardi,* Garfield; *Angelo Ferrara,* Fairfield and *Joseph L. Hartmann,* West Caldwell, N.J. WEIGH FEEDER SYSTEM. Patent dated July 1, 1980. Disclaimer filed Jan. 16, 1984, by the assignee, *Acrison, Inc.*

The term of this patent subsequent to Oct. 18, 1994 has been disclaimed.

[*Official Gazette April 3, 1984.*]